United States Patent [19]

Asano et al.

[11] 4,178,098

[45] Dec. 11, 1979

[54] RANGE DETECTING METHOD AND APPARATUS

[75] Inventors: Noriyuki Asano, Kawasaki; Yukichi Niwa, Yokohama; Mitsutoshi Owada, Yokohama; Takaaki Yamagata, Yokohama; Shin Tsuda, Kawagoe, all of Japan

[73] Assignee: Canon Kabushiki Kaisha, Tokyo, Japan

[21] Appl. No.: 867,343

[22] Filed: Jan. 5, 1978

[30] Foreign Application Priority Data

Jan. 6, 1977 [JP] Japan .................................... 52-506

[51] Int. Cl.² .......................... G01C 3/00; G03B 7/08
[52] U.S. Cl. ...................................... 356/1; 250/201; 354/25; 356/4
[58] Field of Search .................. 356/1, 4; 354/25; 250/201, 204

[56] References Cited

U.S. PATENT DOCUMENTS

| | | | |
|---|---|---|---|
| 3,898,676 | 8/1975 | Hosoe et al. | 354/25 |
| 3,945,023 | 3/1976 | Stauffer | 356/4 |
| 4,004,852 | 1/1977 | Pentecost | 356/1 |

*Primary Examiner*—S. C. Buczinski
*Attorney, Agent, or Firm*—Fitzpatrick, Cella, Harper & Scinto

[57] ABSTRACT

A range detecting method and apparatus in which a first and a second image of an object each having a relative positional parallax corresponding to the object distance formed by a range finding optical system are purely electrically scanned by the use of one or more photosensor arrays and the resulting image scan signals in analog form relating to the first and second images are applied to first and second analog storing devices for storage therein, in which coincidence or non-coincidence between the analog image scan signals is detected by coincidence detecting drive while one of these image scan signals is shifted bit by bit relative to the other image scan signal, thereby counting an amount of shift bits required until the image scan signals of the same bit number relating to the first and second images are rendered most appropriately coincident with each other, whereby the object distance may be known from such amount of shift bits.

23 Claims, 53 Drawing Figures

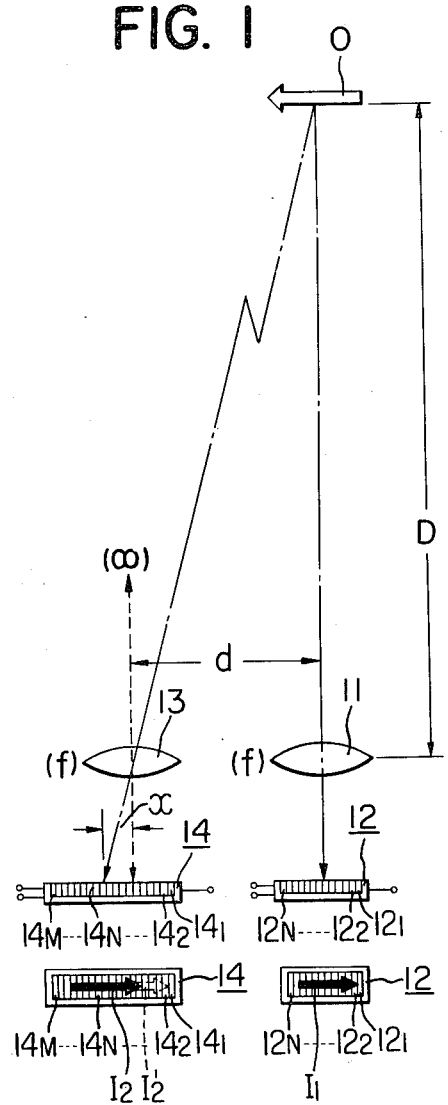
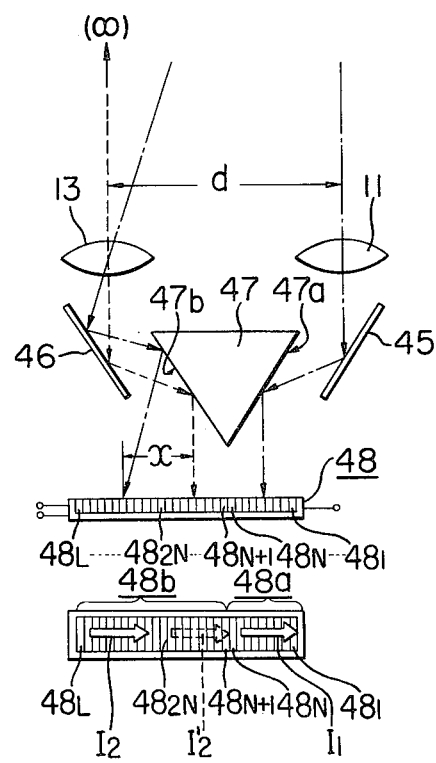

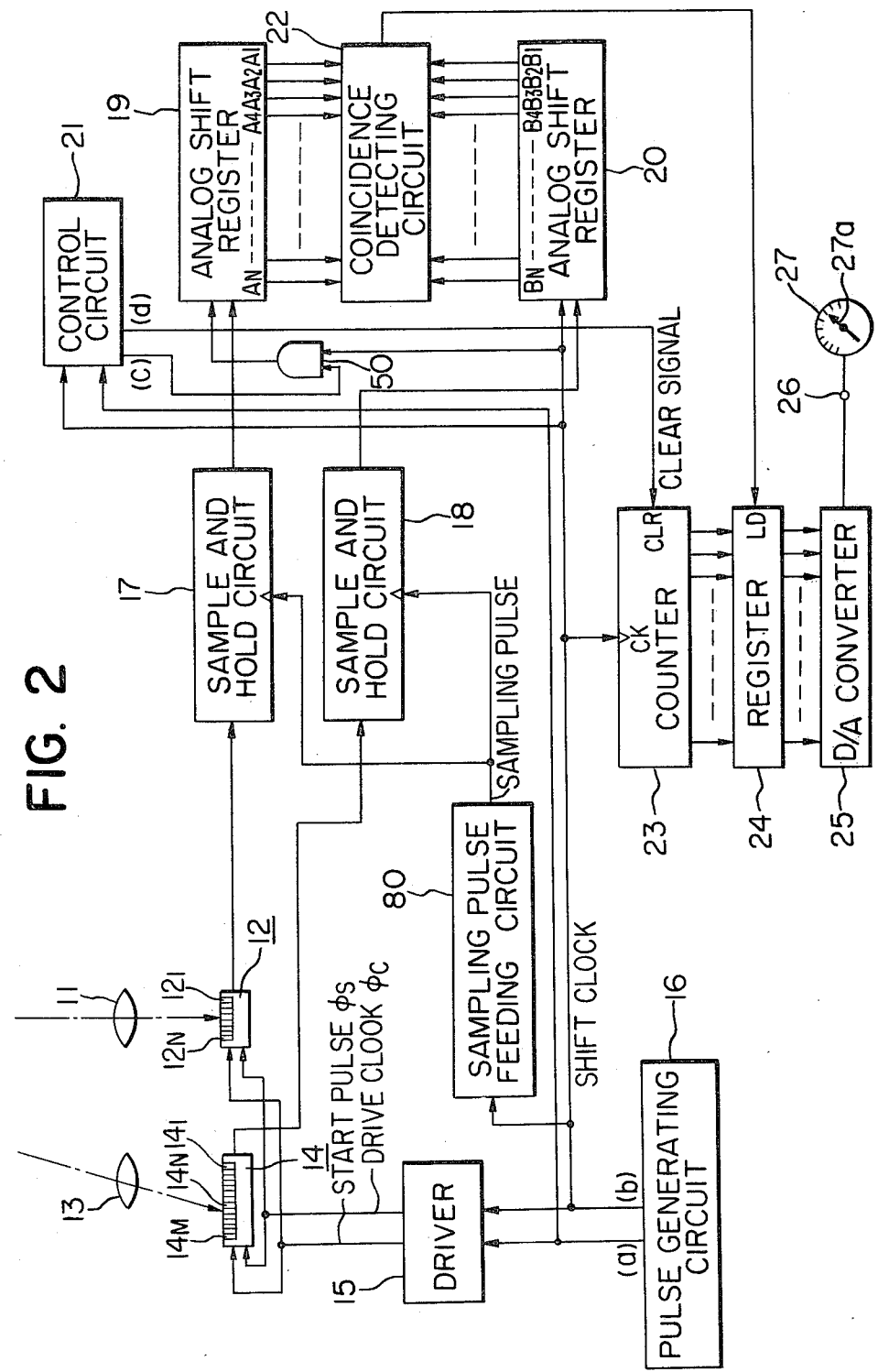

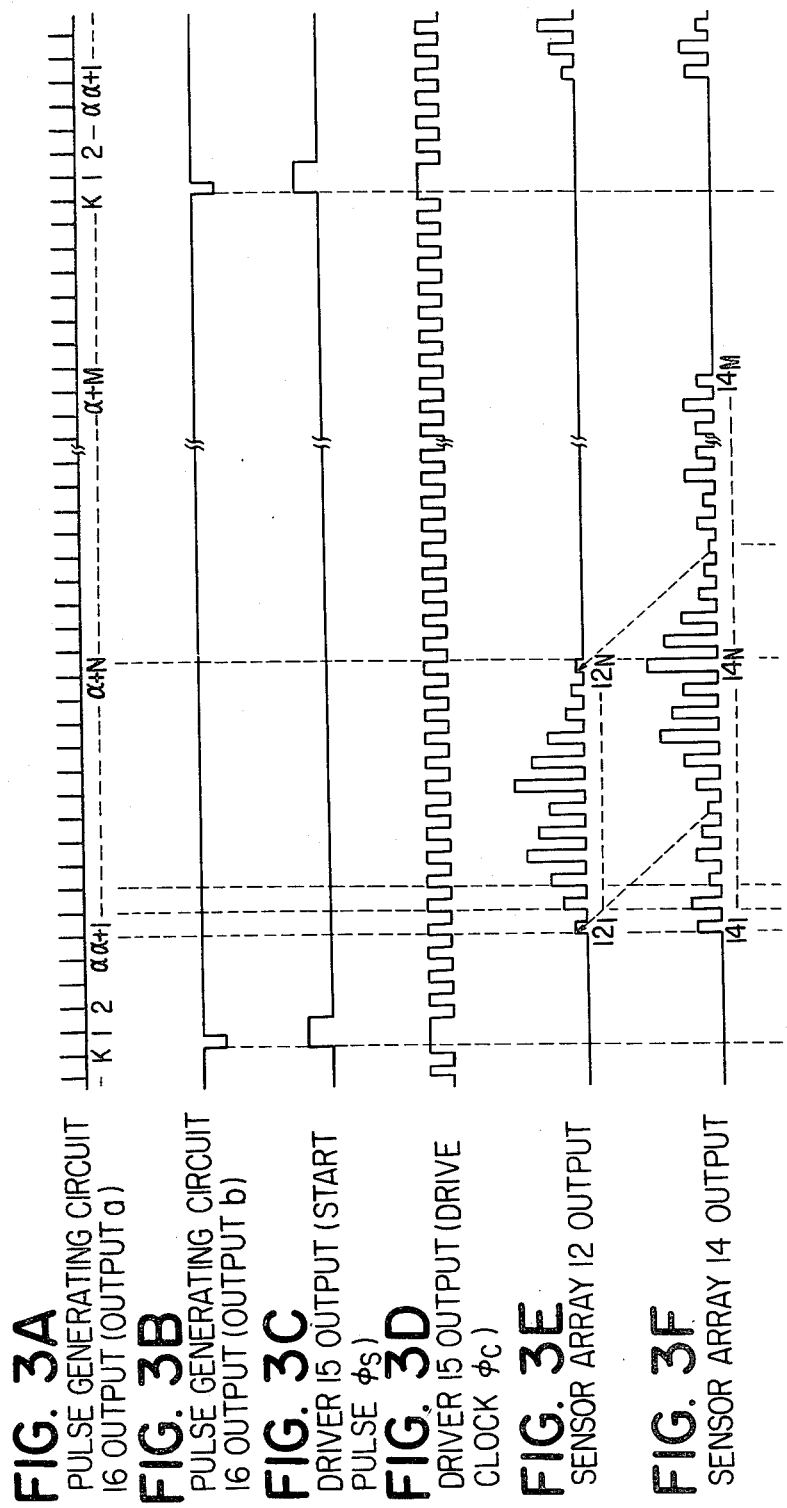

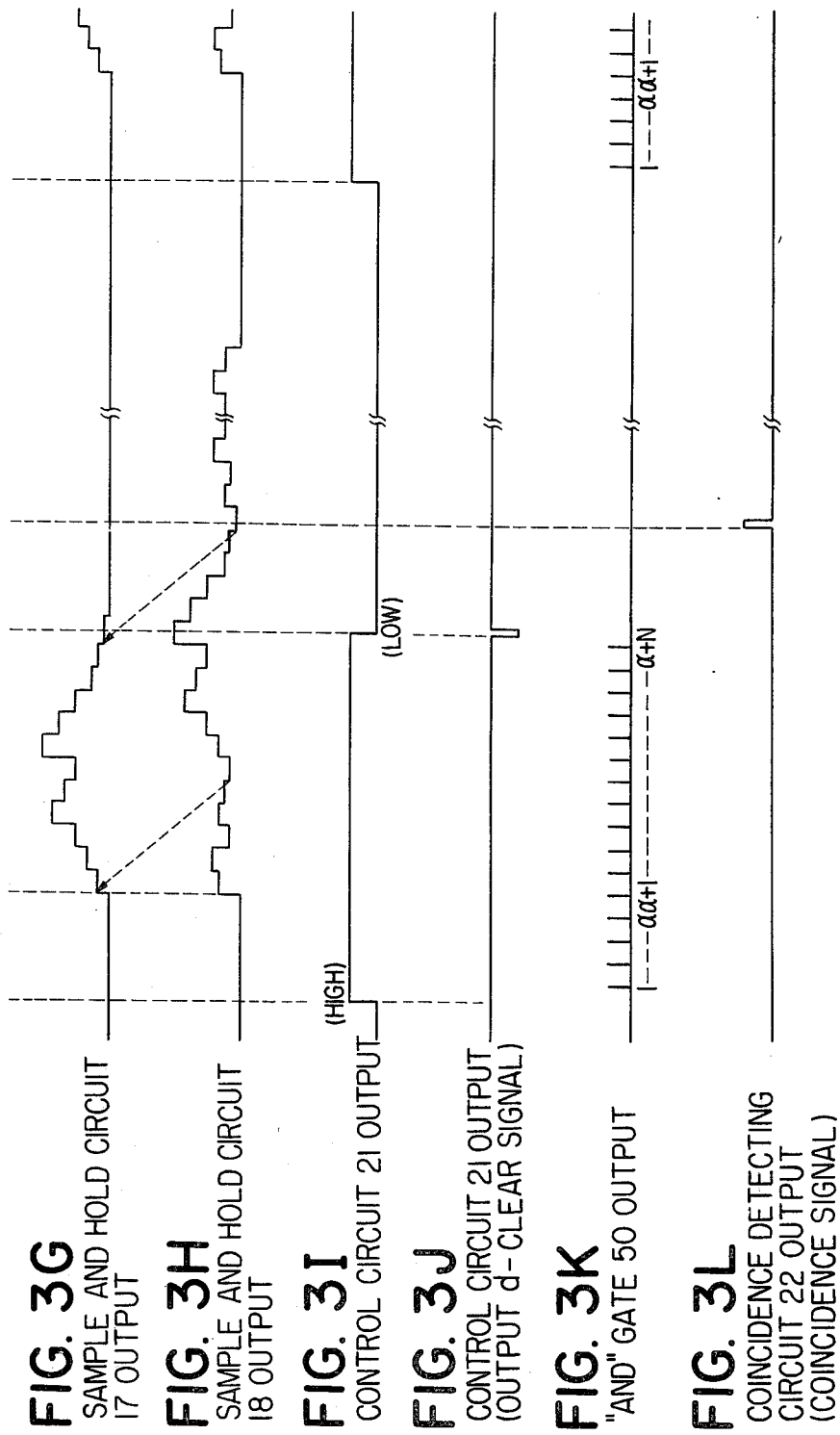

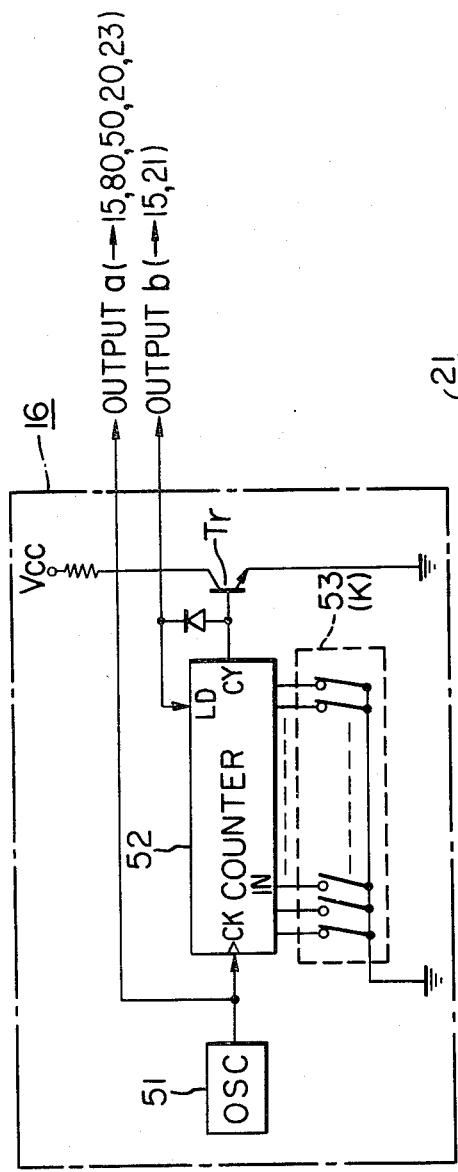
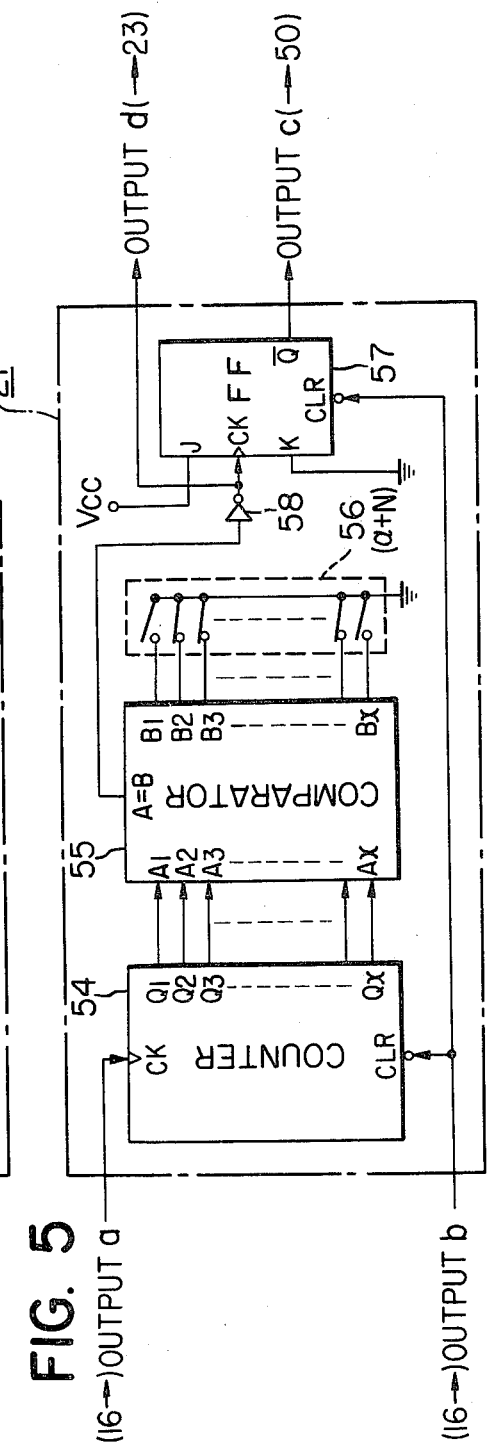
FIG. 4
FIG. 5

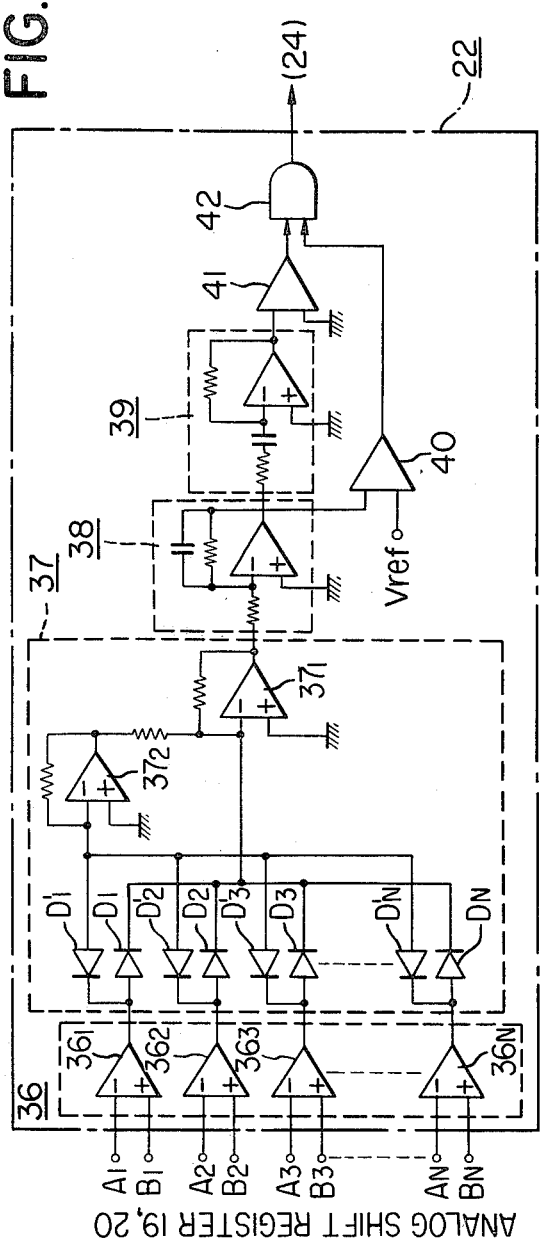
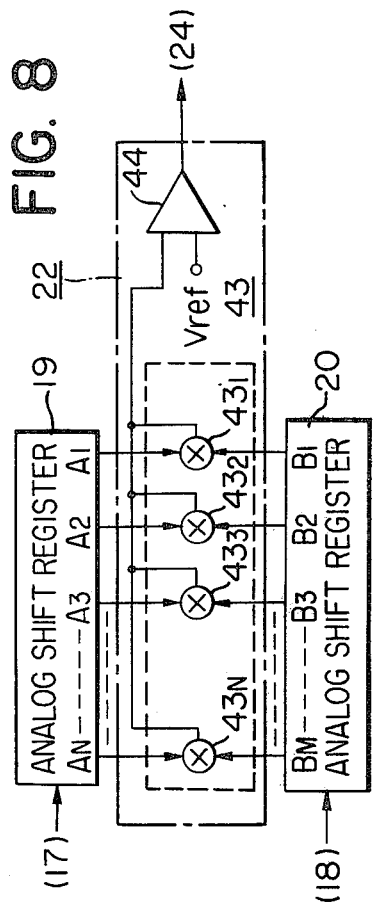
FIG. 6
FIG. 8

FIG. 7A
ABSOLUTE VALUE ADDING CIRCUIT 37 OUTPUT
LEVEL "0"
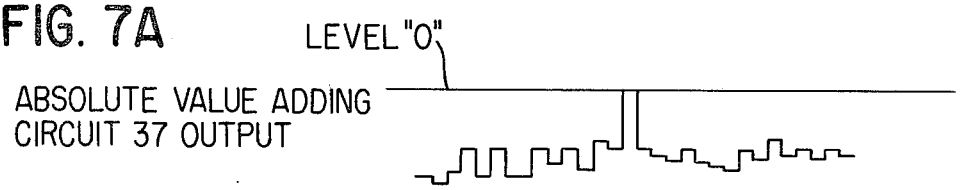
FIG. 7B
INTEGRATION CIRCUIT 38 OUTPUT
LEVEL "0"
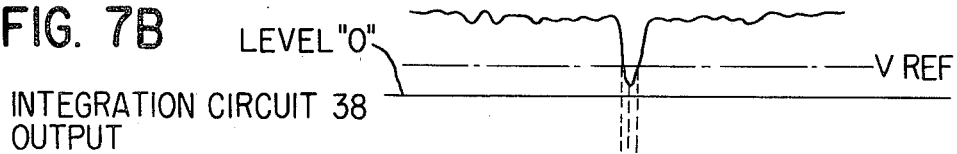
V REF
FIG. 7C
COMPARATOR 40 OUTPUT
FIG. 7D
DIFFERENTIAL CIRCUIT 39 OUTPUT
LEVEL "0"
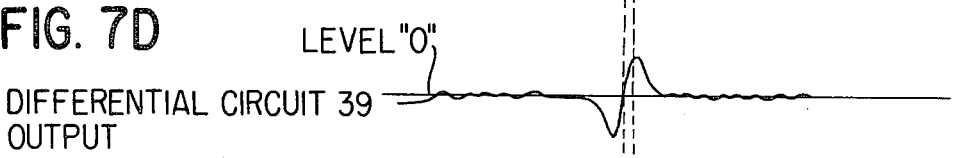
FIG. 7E
COMPARATOR 41 OUTPUT
FIG. 7F
"AND" GATE 42 OUTPUT (COINCIDENCE SIGNAL)

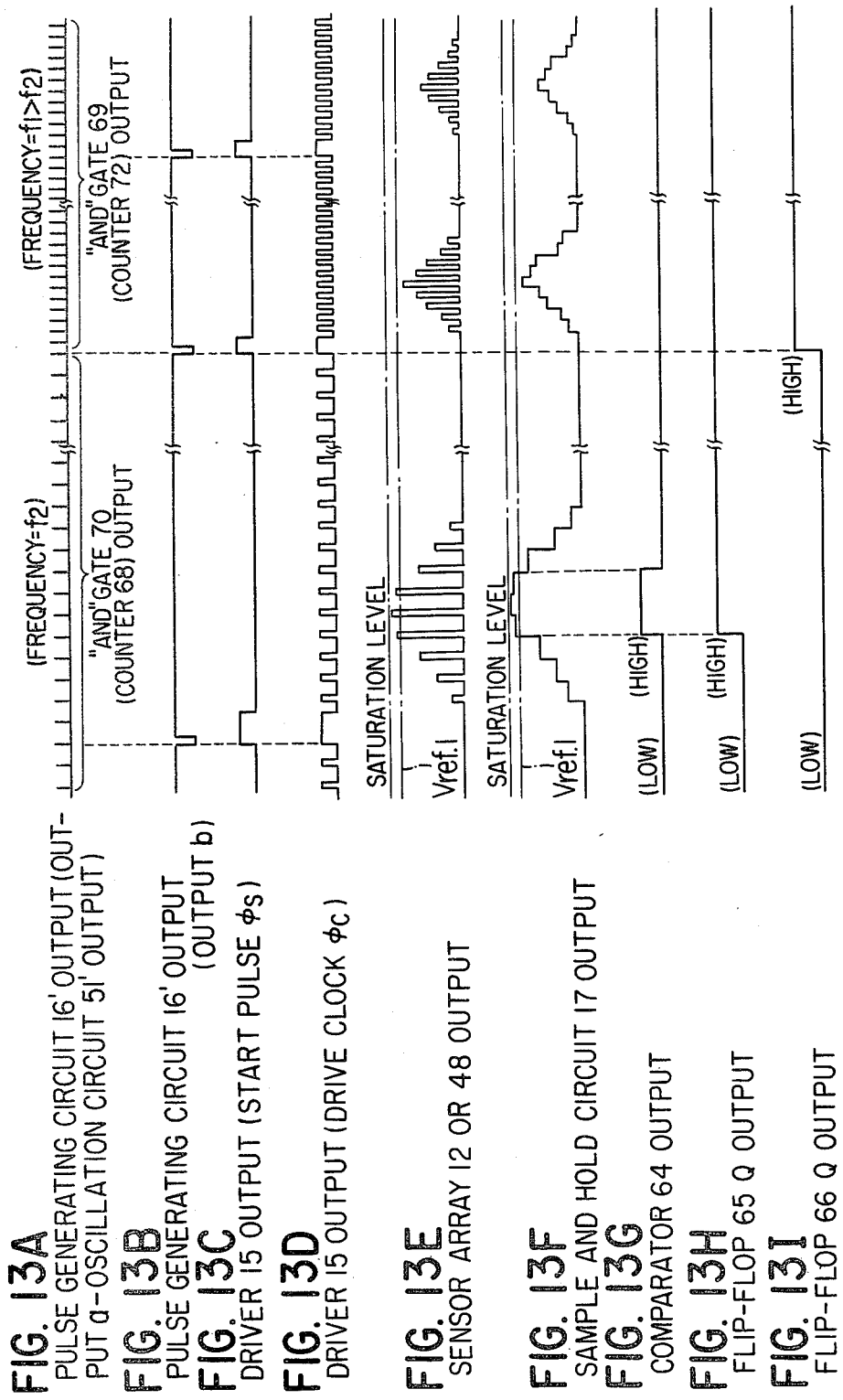
FIG. 13A PULSE GENERATING CIRCUIT 16' OUTPUT (OUTPUT a-OSCILLATION CIRCUIT 51' OUTPUT)
FIG. 13B PULSE GENERATING CIRCUIT 16' OUTPUT (OUTPUT b)
FIG. 13C DRIVER 15 OUTPUT (START PULSE $\phi_S$)
FIG. 13D DRIVER 15 OUTPUT (DRIVE CLOCK $\phi_C$)
FIG. 13E SENSOR ARRAY 12 OR 48 OUTPUT
FIG. 13F SAMPLE AND HOLD CIRCUIT 17 OUTPUT
FIG. 13G COMPARATOR 64 OUTPUT
FIG. 13H FLIP-FLOP 65 Q OUTPUT
FIG. 13I FLIP-FLOP 66 Q OUTPUT

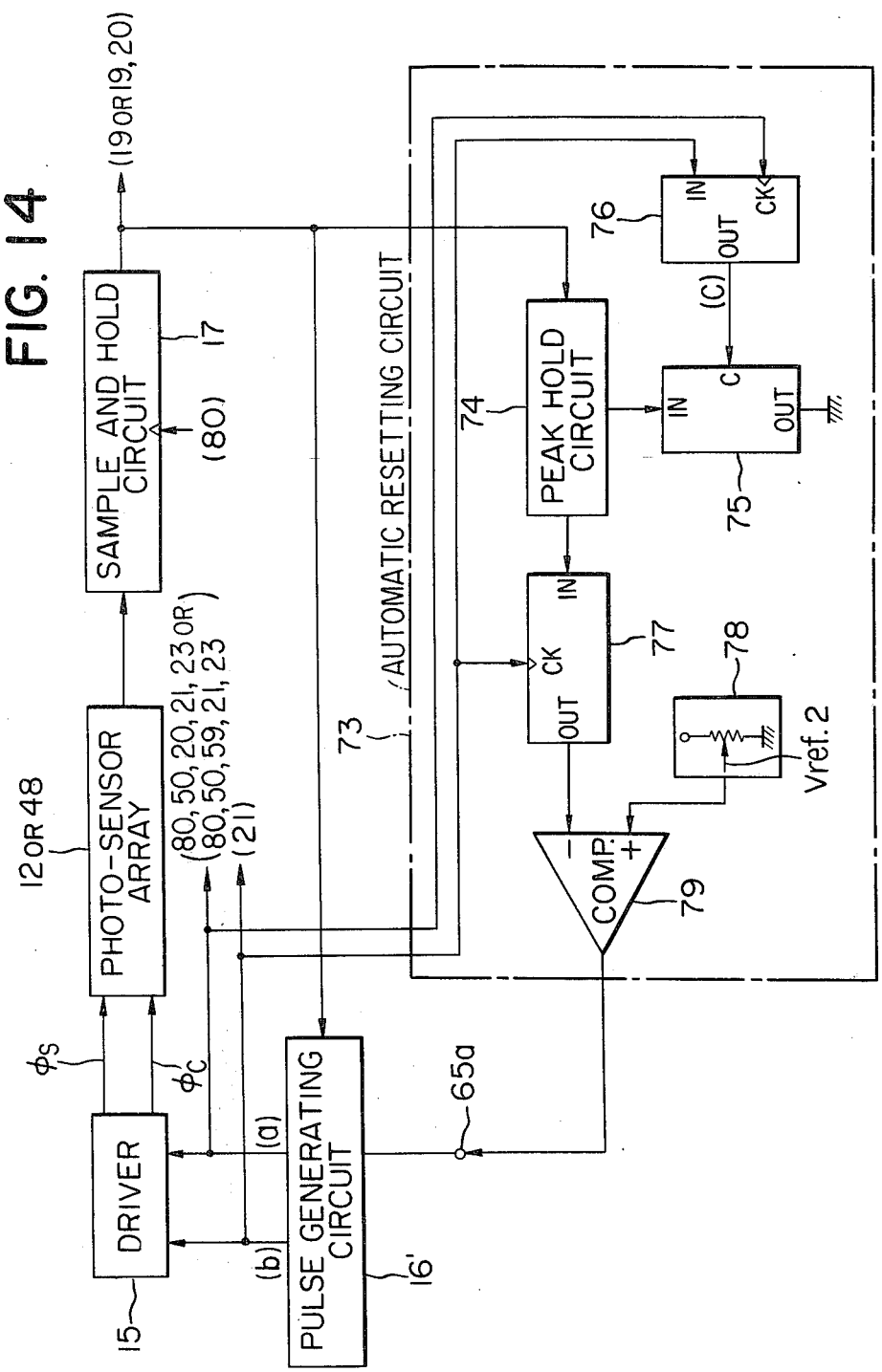

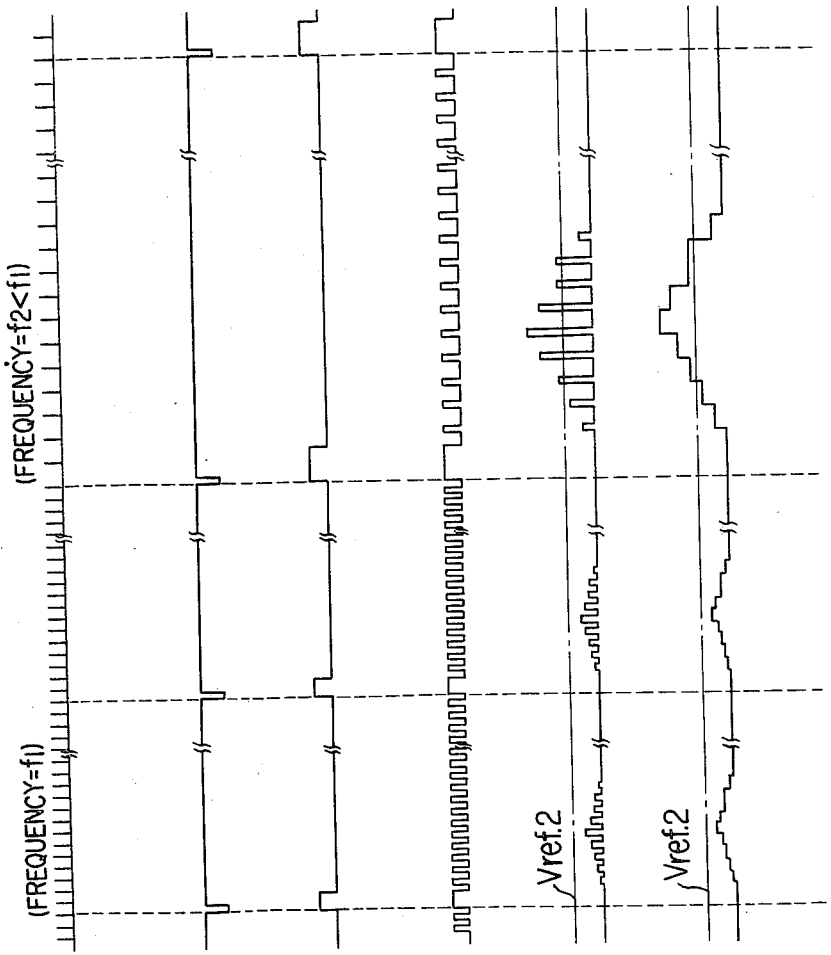

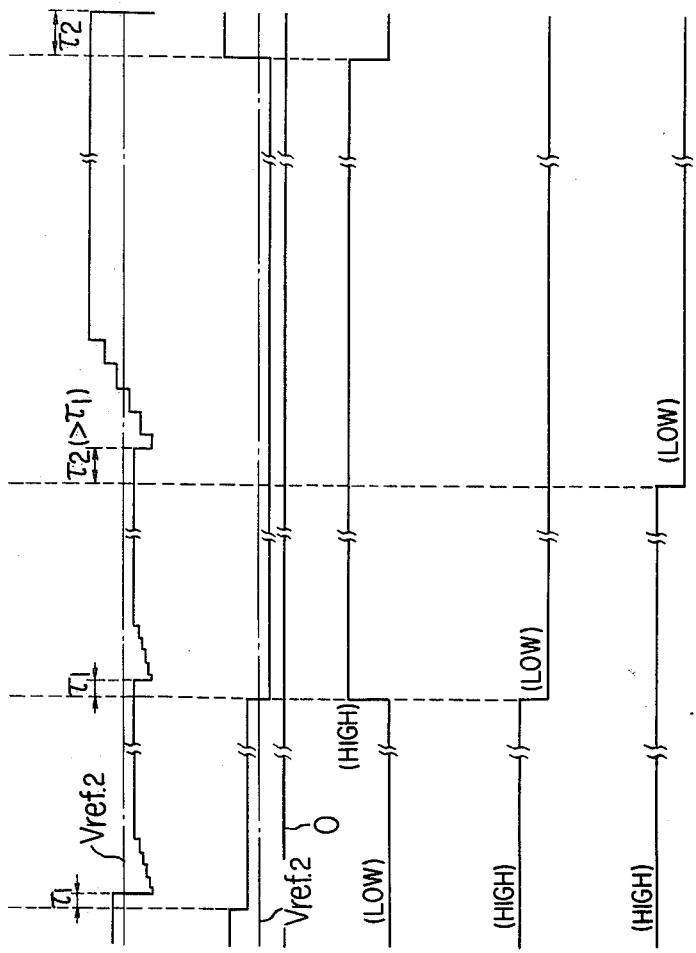

RANGE DETECTING METHOD AND APPARATUS

BACKGROUND OF THE INVENTION

1. Field of the Invention

This invention relates to a range detecting method and apparatus, and more particularly to a range detecting method and apparatus for electrically detecting the amount of spatial relative deviation between two images by adopting the range finding principle of the base line two image-coincidence range finder, and especially to a range detecting method and apparatus in which the two images are scanned to obtain image scan signals relating to these two images, whereby the amount of spatial relative deviation between the two images is detected from the two image scan signals.

2. Description of the Prior Art

There have heretofore been proposed various range detecting methods and apparatus using the described electric two-image coincidence detecting system, i.e., the range finder in which two images of an object having a relative positional parallax corresponding to the object distance and formed by a range finding optical system are received by photoelectric light receiving means so that the quantity of the relative positional parallax between the two images is obtained from the output of the light receiving means to thereby know the object distance, or the automatic focus adjusting device in camera adopting such a range finder.

For example, according to Japanese Patent Publication No. 5773/1973 (published Feb. 20, 1973 and entitled "Automatic Focus Adjusting Device in Camera") assigned to the assignee of the present application, there is proposed a range detecting apparatus in the form of an automatic focus-adjusting device in a camera in which a pair of photoconductive elements designed such that the resistance values thereof may vary with positional changes in the images on the light receiving surfaces thereof are juxtaposed, then the images of the same object are formed on these elements by a range finding optical system comprising a pair of image forming lenses fixedly positioned with an interval of base line length, and a difference between the resistance values of these two elements is detected by the utilization of the fact that the amount of the relative positional parallax between the formed image on the two elements corresponds to the object distance, thereby detecting the object distance.

In such a proposed apparatus, however, the photoconductive element itself is of a very peculiar construction and accordingly, when a pair of such elements are used, it is extremely difficult to coincide the response characteristics of the two elements in an ideal condition. After all, the error signal is increased to deteriorate the detection accuracy, so that even if there is a relative positional parallax between the images on the two elements, the resistance values of these two elements become identical with each other, thus causing a mistake in range detection.

To overcome such a problem, there has been proposed a range detecting apparatus or an automatic focus adjusting device in which the aforementioned two images are purely electrically scanned by the utilization of photoelectric light receiving means to thereby obtain image scan signals relating to these two images, and the amount of relative positional parallax between the two images is obtained from the two image scan signals to thereby know the object distance, or in which the information on the relative positional parallax between these two images are used to automatically accomplish the focus adjustment of the objective lens system in a camera with respect to the object.

For example, according to U.S. Pat. No. 3,898,676 assigned to the same assignee as that of the present invention (filed Dec. 20, 1975, granted to Horsoe, et al, entitled "Distance Detecting Device";, there has been proposed an automatic focus adjusting device in which an array of photosensors is employed as the photoelectric light receiving means for receiving each of the two images and these photosensor arrays are simultaneously driven to obtain time-sequentially the photoelectric output of each photosensor in these arrays, whereby the two images are purely electrically scanned simultaneously and the resulting image scan signals relating to the two images are converted into waveform signals through low-pass filters, whereafter such signals are passed to a phase discriminator which detects the phase difference between these image scan signals, and the output from the phase discriminator is used to operate a servomotor to shift an objective lens system along its optical axis while shifting one of the two images relative to the other, whereby a point at which the phase difference between the image scan signals relating to the two images becomes zero, in other words, a point at which the relative positional parallax between the two images becomes zero, is used as the in-focus position of the objective lens system with respect to the object.

Also, according to Laid-Open Japanese Patent Application No. 45556/1976 (laid-open on Apr. 19, 1976, entitled "Distance Detecting Method and Apparatus), distance detecting method and apparatus are proposed in which a self-scanning image sensor (a kind of photosensor array) is employed as the photoelectric light receiving means for receiving each of said two images and the coincidence or non-coincidence between the image scan signals relating to the two images obtained from image sensors when the two images are repetitively scanned by these image sensors is detected by a coincidence detecting circuit while the scanning start timing of one of the image sensors is varied with respect to the scanning start timing of the other image by a variable delay circuit sensor and, the amount of relative positional parallax between the two images, or the object distance, may be directly known from the amount of deviation between the scanning start timings of the two image sensors when coincidence between said image scan signals is detected by the coincidence detecting circuit.

Any of these methods and apparatuses proposed by the aforementioned U.S. Pat. No. 3,898,676 and Laid-Open Japanese Patent Application No. 45556/1976 utilizes photosensor arrays or image sensors known as photo-diode array, CCD (charge coupled device ) or BBD (bucket bridge device) to purely electrically scan two images of an object formed by a range finding optical system and utilizes the resulting image scan signals relating to said two images for the detection of the object distance or the in-focus point. Especially, the utilization of photosensor arrays or image sensors for the purely electrical scanning leads to the utilization of accurate signals properly corresponding to the patterns of the images and may thus be expected to further enhance the accuracy of the detection of the distance or the in-focus point.

Nevertheless, these methods and apparatuses according to the prior art are far from being put into practical use because they leave numerous problems still to be solved, for example, even in the processing of the image scan signals.

For example, in the apparatus proposed by the aforementioned U.S. Pat. No. 3,898,676, as already noted, the image scan signals are converted into waveform signals by being passed through low-pass filters, and then directed into a phase discriminator, which detects whether or not there is a phase difference between the two signals. However, this phase discriminator deals with analog signals, particularly waveform signals, and is therefore complicated in construction and poor in reliability and thus, particularly if the phase difference is very small, such discriminator cannot detect it accurately and this unavoidably leads to the provision of a functionally very inaccurate automatic focusing device.

Also, in the method and apparatus proposed by the aforementioned Japanese Published Patent Application No. 45556/1976, a differential amplifier or a combination of a differential amplifier and a comparator is simply employed as the circuit for detecting coincidence or incoincidence between the two image scan signals, but when considering that the signals dealt with thereby is time-series signals put out from image sensors, it is nearly impossible to detect coincidence or incoincidence between those signals solely by such a simple construction and accordingly, it can hardly be expected to accomplish highly accurate distance detection. Further, in the method and apparatus now under discussion, a variable delay circuit is used to vary the scanning start timing of one of the image sensors, whereby the amount of deviation between the scanning start timings of the two image sensors is seized as the object distance, but as is commonly recognized well, where use is made of image sensors such as charged storing type photodiode arrays or self-scanning type image sensors such as CCD or BBD, if the scanning start timing thereof, namely, the timing for imparting the start pulse, is varied, the integration time or the effective light reception time is varied to fluctuate the level of the output signal. Accordingly, in such proposed method and apparatus wherein the scanning start timing of one of the image sensors is varied with respect to the scanning start timing of the other image sensor, extreme level fluctuations are caused between the two image scan signals and therefore, even if an effort is made to compare such image scan signals to detect the coincidence therebetween, this is apparently impossible and after all, accurate distance detection is not at all possible.

SUMMARY OF THE INVENTION

Under the circumstances described above, the main object of the present invention is to provide an electrical two-image-coincidence range finding method and apparatus of image scanning type (wherein two images of an object formed by a range finding optical system with relative positional parallax therebetween corresponding to the object distance are each scanned to obtain image scan signals with respect to the two images, from which signals the amount of the relative positional parallax is determined, thereby detecting the object distance) without the above described drawbacks of the conventional art, with satisfactory accuracy of the distance detection, with reliable operation, without any difficulties in incorporating it into a practical machine; which range finding method or apparatus is especially applicable to optical machines, such as cameras, to provide semiautomatic or full automatic focusing mechanism with reliable and accurate focusing control.

Another object of the present invention is to make it possible to accurately and reliably detect the relative positional parallax of the two images through novel signal processing rather than conventional phase discrimination by a phase discrimination circuit, in the process of handling the image scan signals of the two images.

Still another object of the present invention is to improve the accuracy of the distance detection by handling the analog image scan signals without converting the signals into another form other than analog signals.

According to the present invention, said two images formed by the range finding optical systems are purely electrically scanned with the use of one or more photosensor arrays, thereby producing image scan signals of the two images, in the analog form, which signals are applied to and stored in a first analog storing means and a second analog storing means, as they are in the analog form, then coincidence or no-coincidence is detected between the analog signals stored in the first and second storing means, and one set of the image scan signals is shifted one by one bit relative to the other set of the image scan signals, thus counting the number of the shifted bits required until the two sets of the signals of the same bit number become most appropriately coincident. The object distance is obtained from the number of the shifted bits.

In embodying the present invention, one of the two images is used as a reference image, so that the other image is the one to be compared. And the sensing area for the image to be compared is wider than that for the reference image, so that, theoretically the detection is made as to at what signal portion of the image scan signals of the image to be compared they are most appropriately coincident with the image scan signals of the reference image. As for the method of detecting the coincidence between the image scan signals of the image to be compared and the image scan signals of the reference image will be described in the following paragraphs.

The number of bits of the sensing area for the reference image is N, and that for the image to be compared is M which is sufficiently larger than N (M>>N). To these two sensing areas, serial in-parallel out type analog shift registers each having N bits are applied. When N bit analog data, i.e. N bit signals of the reference image and a first N bit signals of the image to be compared are input, the detection of coincidence or non-coincidence by simultaneous parallel comparison on bit-to-bit basis is started with respect to the N bit data stored in the analog shift registers, and whereafter the data of the image to be compared is shifted one by one bit with respect to the data of the reference image at a timing synchronized with the drive of the sensor array by a driver, wherein at each time of the shifting the simultaneous and parallel comparison is carried out. This method is effective to greatly reduce the time required for the processing, and is also satisfactorily avoid the risk that, when an analog shift register is used, the stored data changes, if the data is stored for a relatively long time, resulting in poor accuracy.

Specifically, it should be noted that the present invention employs the detection of coincidence between analog data which means that the raw data is handled infact, as compared with the case where the data is once quantized and then coincidence is detected. Because of this, very accurate detection is expected, and moreover, the construction of the data processing circuit as a whole can be simplified. On the other hand, however, it is very difficult and impractical to detect the complete coincidence using the analog data. In order to overcome the difficulty in handling the analog data, as it is, without damaging the advantage of the analog data handling, that is, the accurate detection, one aspect of the present invention proposes, for example, the detection of the coincidence by detecting a peak of the total of the absolute values of the differences between bits and corresponding bits, or the detection of the coincidence by detecting the predetermined value of the total of the products of bits and corresponding bits. These method of detection are practically desirable in that they do not deteriorate the accuracy of detection to a substantial extent, and in that the simple structure of the circuit is available.

Further object of the present invention is to provide an apparatus and a method which are highly suitable to an automatic focussing mechanism for cameras, or the like, with very high accuracy.

These and other objects, advantages, features, and uses will become more apparent as the description proceeds, when considered with the accompanying drawings.

BREIF DESCRIPTION OF THE DRAWINGS

FIG. 1 is a schematic diagram illustrating the range finding principle to which the present invention is related;

FIG. 2 is a block diagram of a circuit according to an embodiment of the present invention;

FIGS. 3A to 3L show waveforms from the outputs of the main circuit blocks shown in FIG. 3;

FIG. 4 shows an embodiment of the circuit for generating pulses shown in FIG. 2;

FIG. 5 shows an embodiment of the control circuit shown in FIG. 2;

FIG. 6 shows an embodiment of the coincidence detection circuit of FIG. 2;

FIGS. 7A to 7F shows output waveforms of the major circuit blocks in the coincidence detection circuit shown in FIG. 6;

FIG. 8 shows another embodiment of the coincidence detection circuit of FIG. 2;

FIG. 9 is a schematic diagram, especially with respect to an optical arrangement, of another embodiment of the present invention;

FIGS. 13A to 13I show output waveforms of the pulse generating circuit of FIG. 12, and the main circuit of the range finder of FIG. 2 or 10;

FIG. 14 shows an embodiment of an automatic resetting circuit applicable to the pulse generating circuit shown in FIG. 12;

FIGS. 15A to 15K show output waveforms of major circuit block of the automatic resetting circuit, the range finder of FIG. 2 or 10, and the pulse generating circuit of FIG. 12;

DESCRIPTION OF THE PREFERRED EMBODIMENT

Figure 10:
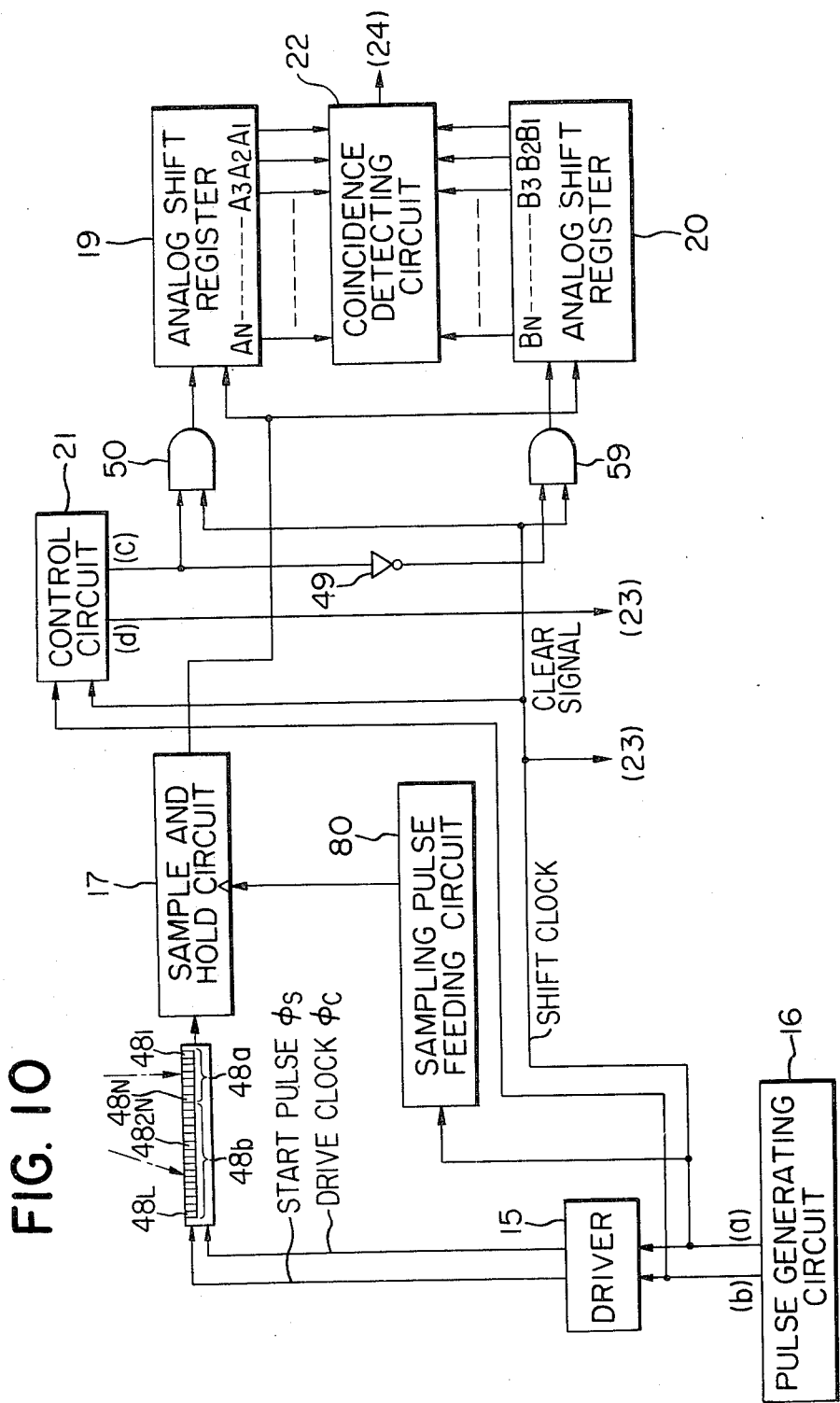
FIG. 10 is a block diagram of an electrical circuit which can be used for the arrangement shown in FIG. 9, and shows especially the major portions which are different from the case of the embodiment of FIG. 2.

Reference is first made to FIG. 1 to describe the principle of the present invention. A pair of image forming lenses 11, 13 for range finding are fixedly disposed at an interval of a predetermined base line length, and photosensor arrays 12 and 14 are fixedly disposed so as to correspond to the respective lenses 11 and 13. The sensor array 12 comprises N numbers of tiny photosensors $12_1, 12_2, \ldots 12_N$ linearly regularly arranged, while on the other hand the sensor array 14 comprises M photosensors $14_1, 14_2, \ldots 14_M$ configured and linearly regularly arranged like the sensors $12_1, 12_2, \ldots 12_N$ in the sensor array 12 (M is a sufficiently greater number than N).

In such an arrangement, images of an object O are formed on the sensor arrays 12 and 14 by the lenses 11 and 13. In this instance, the set of the lens 11 and the sensor array 12 is used for collimating the object O and accordingly, the image $I_1$ of the object O by the lens 11 is always formed substantially at a predetermined position on the sensor array 12 because the optical axis of the lens 11 is coincided with the object O, whereas the image $I_2$ of the object O by the lens 13 is formed at a position deviated relative to the forming position of the image $I_1$ on the sensor array 12, by an amount corresponding to the distance to the object O. The amount of deviation of the forming position of the image $I_2$ on the sensor array 14, relative to that of the image $I_1$ on the sensor array, may be converted into the amount of deviation x from the forming position of the image of the object O formed on the sensor array 14 (such position is indicated by $I'_2$ in FIG. 1) when the object is ideally at infinity and the optical axis of the lens 13 is accordingly coincident with the object O. From this quantity of deviation x, the distance to the object O can be detected.

Let the base line length between the lenses 11 and 13 be d and the focal length of the lenses be f. From the amount of deviation x of said image position, the distance D to the object O may be expressed as:

$$D = d \cdot f / x$$

Such amount of deviation x can be obtained from the size of the photosensors $14_1, \ldots 14_M$ in the sensor array 14 and from a number which covers such amount of deviation x.

In the present invention, in order to obtain such amount of deviation x, the image element signal trains from individual ones of the same number (say, N) of photosensors in the sensor arrays 12 and 14 are taken out time sequentially, and these signals as they are analog signals are applied to discrete analog recording means. At this time, the image element signal train from the sensor array 12 is memorized by one recording means, while the image element signal train from the sensor array 14 is sequentially shifted (for example, bit by bit) in the other recording means with the aid of clock pulse. Coincidence or non-coincidence between the recorded values in the two recording means is simultaneously discriminated with a plurality of bits at each time the shift occurs, thereby counting the clock pulse number spent for the shift of the image element signal trains from initiation of the shift of the image element signal train from the sensor array 14 until the recorded values in the two recording means can be regarded as having become substantially coincident, and value so counted provides the aforementioned amount of deviation x, namely, the distance information to the object O.

With the above-described principle of the present invention in view, description will hereinafter be made of some specific embodiments of the invention.

In FIG. 2 which shows an embodiment of the present invention, the optical arrangement is quite similar to that shown in FIG. 1, with the exception that self-scanning type sensor arrays are employed as the photosensor arrays 12 and 14. Designated by 16 is a pulse generating circuit for generating reference pulses required for driving the sensor arrays 12 and 14 and for the sequential control of various circuit elements which will hereinafter be described. The pulse generating circuit 16 is designed to generate a reference clock pulse (output a) as shown in FIG. 3A, and a reference pulse (output b) as shown in FIG. 3B which appears at every Kth frequency division of said reference clock pulse (K is a sufficiently greater number than the number M of sensors in the sensor array 14). Designated by 15 is a driver for driving the sensor arrays 12 and 14 in accordance with the aforementioned reference pulse and reference clock pulse generated by the pulse generating circuit 16. The driver 15 is designed to produce a start pulse $\phi_s$ as shown in FIG. 3C in accordance with the reference pulse (output b) and to produce a drive clock $\phi_c$ as shown in FIG. 3D in accordance with the reference clock pulse (output a), and by imparting these to the sensor arrays 12 and 14 to cause the image element signals from the individual photosensors $12_1$-$12_N$ and $14_1$-$14_M$ in the sensor arrays 12 and 14 to be forwarded time sequentially as shown in FIGS. 3E and 3F. The drive clock $\phi_c$ actually used to drive the photosensor arrays is of four or two-phase, but herein it is described as single-phase for easier understanding. Designated by 17 and 18 are sample and hold circuits which may be supplied from a sampling pulse feeding circuit 80 with a sampling pulse coincident in timing with these image element signals from the sensor arrays 12 and 14, to thereby take in the picture element signal outputs from the sensor arrays 12 and 14 and hold them until the next sampling pulse is supplied. Thus, by these sample and hold circuits 17 and 18, the pulse-like image scan signals as shown in FIGS. 3E and 3F are converted into full wave or duty 100% signals as shown in FIGS. 3G and 3H. The sampling pulse feeding circuit 80 is designed to receive the reference clock pulse (output a) as input from the pulse generating circuit 16 and shape it into a pulse coincident with the ouput timing of the image element signals from the sensor arrays 12 and 14, thereafter impart such pulse as the sampling pulse to the sample and hold circuits 17 and 18, whereby the sample and hold circuits 17 and 18 may seize the peaks of rising (or falling) of the image element signals from the sensor arrays 12 and 14 and hold them. Incidentally, these sample and hold circuits 17 and 18 may be eliminated where use is made of a photosensor device such as a combination of photodiode array and CCD which may directly provide full wave or duty 100% video signals.

Designated by 19 and 20 are analog shift registers of the serial-in-parallel-out type for recording the time in sequential image element signals imparted from the sensor arrays 12 and 14 through the sample and hold circuits 17 and 18. Such shift registers are commercially available under the tradename TAD (Tapped Analogue Delay). The shown analog shift registers 19 and 20 are of N-bit construction ($A_1$-$A_N$ and $B_1$-$B_N$) particularly corresponding to the number of sensors in the sensor array 12, and are driven by the reference clock pulse (output a) from the pulse generating circuit 16 at a speed equal to the feed rate of the image element signals from the sensor arrays 12 and 14 and thus, when the sensor arrays 12 and 14 are driven by the driver 15, the analog shift registers 19 and 20 successively records the individual picture element signals from the sample and hold circuits 17 and 18 while shifting these signals by one bit for each clock, and puts out the recorded values in parallel fashion.

Designated by 21 is a control circuit for supplying the shift clock pulse to the shift register 19 and for receiving the reference clock pulse (output a) from the pulse generating circuit 16 at the input terminal CK thereof to control the counting operation of a counter 23 which counts the reference clock pulse. The control circuit 21 is so constructed that it may impart to an AND gate 50, which is provided to receive as input thereto both reference clock pulse (output a) and reference pulse (output b) from the pulse generating circuit 16 to first control the supply of the shift clock pulse to the shift register 19, a signal (output c) which, as shown in FIG. 3I, assumes the high level from the time of generation of the reference pulse (output b) till the time of generation of the $\alpha$+Nth reference clock pulse (output a) in the pulse generating circuit 16, and then assumes the low level during a period until the reference pulse (output b) is again generated, and that it may impart a clear signal (output d) to the clear terminal CLR of the aforementioned counter 23, as shown in FIG. 3J, when the aforementioned $\alpha$+Nth reference clock pulse (output a) is generated.

By this construction, the shift register 19 is supplied with only the first to the $\alpha$+Nth reference clock pulses (output a) after the generation of the reference pulse (output b), as shown in FIG. 3K, through the AND gate 50. On account of this shift register 19 is caused to stop its shift operation at a point of time when each of the image element signals from all the sensors $12_1$-$12_N$ in the sensor array 12 has been completely recorded, thereby holding the recorded values at that time. In contrast, the shift register 20 continues to effect its shift operation as long as the reference clock pulse (output a) from the pulse generating circuit 16 is imparted thereto and therefore, in accordance with the pulses subsequent to the $(\alpha+N+1)$th pulse, the recorded values in the shift register 20 are shifted by one bit at each clock, relative to the recorded values in the shift register 19, with a result that at each of these shifts, image element signals $14_1-14_N \to 14_2-14_{N+1} \to 14_3-14_{N+2} \to \ldots$ deviated by one bit relative to one another are put out in parallel fashion.

At a time instant when the counter 23 has counted the aforementioned $(\alpha+N)$th reference clock pulse (output a), it is once cleared to be supplied with a clear signal (output d—FIG. 3J) to thereby be cleared once, and newly starts counting from the $(\alpha+N+1)$th reference clock pulse.

The number "$\alpha$" is one to be set in the following manner as seen from FIGS. 3A to 3F. When the sensor arrays 12 and 14 are driven, they do not start production of the output image element signals in response to the first reference clock pulse (output a) after the generation of the reference pulse (output b) from the pulse generating circuit 16, but start production of output image element signals in correspondence to a reference clock pulse slightly delayed from the first reference clock pulse, because of the construction of the sensor arrays and the manner of driving fashion of the driver 15. Therefore, the number "$\alpha$" is set in conformity to the delay from the first reference clock pulse and this may be suitably selected in accordance with the delay from the first reference clock pulse so that the output of the image element signals from the sensor arrays may be started in accordance with the construction of the sensor arrays used and the driving fashion of the driver employed.

Designated by 22 is a coincidence detecting circuit for detecting coincidence or non-coincidence between the recorded values of N bits in the shift registers 19 and 20. This coincidence detecting circuit 22 is designed to produce an output coincidence signal as shown in FIG. 3L when a state which can be regarded as a substantial coincidence between the recorded values, if not complete coincidence, has been detected.

Denoted by 24 is a register responsive to the coincidence signal from the coincidence detecting circuit 22 to read the value counted by the counter 23 at a point of time whereat the detecting circuit 22 has detected the substantial coincidence between the recorded values in the two shift registers 19 and 20, and the coincidence signal from the coincidence detecting circuit 22 is connected to be imparted to load terminal LD of the register 24.

Reference numeral 25 designates a D/A converter which is so constructed that it may introduce thereinto as an input the recorded value of the register 24, analog-process such recorded value in accordance with the distance equation $D=d.f/x$ described in connection with FIG. 1 and produce as an output an analog signal (e.g. a voltage) corresponding to the distance D. Denoted by 27 is a meter, acting as display means for displaying the object distance, which is connected to the output terminal 26 of the D/A converter 25.

In the above-described construction, the set of lens 11 and sensor array 12 is collimated to the object and accordingly, the reference image of the object is formed substantially at a fixed position on the sensor array 12 by the lens 11. On the other hand, when one and the same image of the object is formed at a position on the sensor array 14 by the lens 13 in a state of relatively deviated in accordance with the distance to the object, and under which condition the reference clock pulse (output a) and the reference pulse (output b) as shown in FIGS. 3A and 3B are generated from the pulse generating circuit 16, the driver 15 is operated, and the image element signals from the individual sensors in the sensor arrays 12 and 14 are derived time sequentially (FIG. 3E and 3F. These signals are converted into full wave signals by the sample and hold circuits 17 and 18 as shown in FIGS. 3G and 3H, after which they are imparted to the shift registers 19 and 20. On the other hand, at this time, the control circuit 21 applies a high level signal (output c) to the AND gate 50 in response to the reference pulse (output b) from the pulse generating circuit 16, as shown in FIGS. 3I and 3J. Accordingly, as will be seen from FIGS. 3A and 3K, the shift registers 19 and 20 are driven by the reference clock pulse (output a) from the pulse generating circuit 16 and sequentially record the time sequential image element signals from the sensor arrays 12 and 14 to be imparted through the sample and hold circuits 17 and 18, while it is being shifted bit by bit, thereby becoming ready to produce as an output recorded signals in parallel at every time.

When the $(\alpha+N)$th reference clock pulse (output a) has been put out from the pulse generating circuit 16, the control circuit 21 imparts low level signal (output c) to the AND gate 50 and clear signal (output d) to the counter 23, as shown in FIGS. 3I and 3J to cut off supply of the reference clock pulse (output a) from the pulse generating circuit 16 to the shift register 19, thereby stopping the shift of the shift register 19 (accordingly, the shift register 19 comes to hold the image element signals from all the sensors $12_1-12_N$ in the sensor array 12) and also clearing the counter 23. Thus, for the $(\alpha+N+1)$th and subsequent reference clock pulses (output a), the shift register 20 alone continues to effect the shifting and the counter 23 newly starts to count the number of the reference clock pulses from this $(\alpha+N+1)$th reference clock pulse.

In the meantime, the coincidence detecting circuit 22 continues to detect coincidence between the recorded values in the two shift registers 19 and 20. When the shift register 20 alone is caused to shift bit by bit by the $(\alpha+N+1)$th and subsequent reference clock pulses (output a), and in the cause of the image element signals recorded therein successively changing in the order of $14_1-14_N \to 14_2-14_N \to 14_3-14_{N+2}, \ldots$ course, when the detection circuit 22 detects a state in which the recorded values in both shift registers 19 and 20 can be regarded as having been substantially coincided, it produces a coincidence signal output as shown in FIG. 3M to a register 24. The register 24, which has been applied with the coincidence signal from the coincidence detecting circuit 22, as its load terminal LD, comes to read the values counted by the counter 23. Thus, the recorded value of the register 24 at this time provides the distance to the object.

The recorded value in the register 24 is converted by the D/A converter 25 into, for example, a voltage value. As a result the distance information is indicated in terms of a deviation of a pointer needle 27a of the display meter 27 connected to the output terminal 26 of the D/A converter 25. The mode of such display of the distance information is not restricted to the analog means as shown, but may of course be accomplished digitally by the use of a digital display element. In the latter case, the recorded value in the register 24 is converted into a digital code for display so that the digital display element may be driven by the digital code.

In the following particular explanations will be given to actual examples of the pulse generating circuit 16, the control circuit 21 and the coincidence detecting circuit 22.

First, for the pulse generating circuit 16 there may be herein adopted, for example, a construction as shown in FIG. 4. In FIG. 4, 51 refers to an oscillator which is preadjusted to generate the reference clock pulse as shown in FIG. 3A. Denoted by 52 is a counter which receives the clock pulses from the oscillator 51 through its input terminal CK, and counts the number of the clock pulses. The counter 52 is so constructed that it may produce as an output the carrier signal from the carrier output terminal CY when the counted value has reached a value set by a counted value setting switch circuit 53. Tr is a transistor whose collector receives the voltage Vcc, whose emitter is grounded and whose base is connected to the carrier output terminal of the counter 52. According to such construction, the reference clock pulse as shown in FIG. 3A is first produced as an output a from the oscillator 51, and the pulse as shown in FIG. 3B is obtained from the signal line connected to the collector side of the transistor Tr, because the transistor Tr becomes conductive in response to the carrier signal when the counter 52 has counted the number of the reference clock pulses from the oscillator 51 to a value set by the switch circuit 53. Thus, if the constant K is set by the combination of closing and opening of the switches in the switch circuit 53 taking into consideration the number $\alpha$ and the number M of the sensors in the sensor array 14, the reference pulse as shown in FIG. 3B will be obtained as output b from the signal line connected to the collector side of the transistor Tr at every time the counter 52 counts the reference clock pulses from the oscillator 51 for K numbers. The reference pulse obtained at the collector of the transistor Tr is imparted as the load signal to the load terminal LD of the counter 52. This pulse is for newly introducing a value set by the switch circuit 53 when the counter 52 has counted up to the value set by the switch circuit 53.

For the control circuit 21, there may be adopted for example, a construction as shown in FIG. 5. In FIG. 5, 54 is a counter which receives through its input terminal CK the reference clock pulse (output a) from the pulse generating circuit 16 and is cleared by the reference pulse (output b), 55 a comparator which compares the value counted by the counter 54 with the value set by the constant setting switch circuit 56, and produces as an output a coincidence signal when the counted value in the counter 54 becomes coincident with the value set in the switch circuit 56, and 57 a J-K type flip-flop which receives through its input terminal CK the coincidence signal imparted from the comparator 56 through an inverter 58. The flip-flop 57 has input terminal J for receiving a voltage Vcc another input terminal K which is grounded and a clear terminal CLR for receiving the reference pulse (output b) as in the counter 54. According to such a construction, when the flip-flop 57 is being cleared by the reference pulse (output b) from the pulse generating circuit 16, the $\overline{Q}$ output thereof is at the "high" level but, after the counter 54 has been cleared by the reference pulse (output b), and when the count has been stated from the first reference clock pulse (output a) and reached the value set by the switch circuit 56, the coincidence signal output is produced from the comparator 55, whereby the flip-flop 57 which receives this output coincidence through the inverter 58 is inverted and the $\overline{Q}$ output thereof changes from "high" to "low". When the counter 54 is again cleared by the next reference pulse (output b), the $\overline{Q}$ output returns from "low" to "high". Accordingly, if the constant $\alpha+N$ is set by the combination of closing and opening of the switches in the switch circuit 56, the flip-flop 57 becomes inverted when the value counted by the counter 54 has reached $\alpha+N$, on account of which the $\overline{Q}$ output assumes the "high" level from the time of generation of the reference pulse (output b) in the pulse generating circuit 16 till the time of generation of the $(\alpha+N)$th reference clock pulse (output a), whereafter the $\overline{Q}$ output assumes the "low" level until the next reference pulse (output b) is generated. After all, this Q output can be utilized as the output c shown in FIG. 3I to control the AND gate 50. Also, the clear signal for clearing the counter 23 (output d—FIG. 3J may be), the output of the inverter 58 may be directly utilized.

Next, for the coincidence detecting circuit 22, there may be adopted for example, a construction as shown in FIG. 6 or FIG. 8.

To comment here in particular, in case the time-sequential image element signals from the sensor arrays 12 and 14 are treated as they are namely, in the form of the analog values to detect the coincidence therebetween as has been explained in the foregoing, it is extremely difficult and not practical to detect the complete coincidence in view of the characteristics of the individual photosensors and the characteristics of other circuit elements. Therefore, both of the two examples of the coincidence detection circuit which will hereinafter be described are so constructed as to producing the coincidence signal output when the most appropriate coincidence is detected, not the perfect coincidence.

Reference is first had to ehe example shown in FIG. 6. The construction shown in FIG. 6 is designed such that in the course of adding the differences between the image element signals recorded in mutually corresponding bits $A_1-B_1, A_2-B_2, \ldots A_N-B_N$ in the two shift registers 19 and 20 are added together in absolute values with respect to all of N bits, and shifting the shift register 20 alone while the shift resister 19 is held, the recorded values in the two shift registers 19 and 20 are regarded as coincided when the value of such addition has become minimum. In the drawing, a reference numeral 36 designates a differential amplifier circuit consisting of differential amplifiers $36_1, 36_2, 36_3, \ldots 36_N$ corresponding in number to the bit numbers in the shift registers 19 and 20, i.e. N numbers. The input terminals of the amplifiers $36_1-36_N$ are individually connected to the mutually corresponding bits $A_1-B_1, A_2-B_2, A_3-B_3, \ldots, A_N-B_N$ in the twoshift registers 19 and 20, so that the outputs of the amplifiers $36_1-36_N$ represent the differences between the image element signals recorded in the mutually corresponding bits in the shift registers 19 and 20.

Designated by 37 is an absolute value adding circuit for adding together in absolute values the difference signals put out from the amplifiers $36_1-36_N$ in the differential amplifier circuit 36. This adding circuit 37 comprises a differential amplifier $37_1$ to which the outputs from the amplifiers $36_1-36_N$ are applied through N numbers of diodes $D_1-D_N$ forwardly connected thereto, and a differential amplifier $37_2$ which applies the sum as the output and input to the amplifier $37_1$ through inversely connected N numbers of diodes $D_1'-D_N'$. The sum of the absolute values of the individual difference signals from the amplifiers $36_1-36_N$ is produced as an output from the amplifiers 37₁. The output of the absolute value adding circuit 37 is shown in FIG. 7A.

Designated by 38 is an integration circuit functioning as a kind of a filter for converting the output from the absolute adding circuit into a waveform signal as shown in FIG. 7B, because the shift of the shift register 20 is effected by a clock pulse and accordingly said output from the absolute adding circuit becomes a kind of rectangular wave signal as shown in FIGS. 7A. Denoted by 39 is a differentiation circuit for differentiating the output of the differentiation circuit 38. The output of the integration circuit 39 is shown in FIG. 7D.

Reference numeral 40 designates a comparator for setting a range for the sum of the aforementioned difference signals, which is to be the object of comparison. The comparator compares the output from the integration circuit 38 with a predetermined reference voltage $V_{ref}$ and produces a "high" level signal output in the digital value in response to the signal having a voltage lower than the reference voltage $V_{ref}$ as shown in FIG. 7C. By this comparator 40, error signals resulting from the noise and oscillation outside the object range can be eliminated.

Designated by 41 is a comparator for converting the output of the differentiation circuit 39 into a digital value as shown in FIG. 7(E), and 42 an AND gate for taking "AND" of the outputs of said comparators 40 and 41.

According to such construction a "high" level signal output as shown in FIG. 7F is produced from an AND gate 42 in the course of shifting of the shift register 20, when the output from the integration circuit 38 (FIG. 7B) reaches a voltage level lower than the reference voltage $V_{ref}$ and, at this time, the differentiation pulse output (FIG. 7D) is produced from the differentiation circuit 39; or in other words, when the sum of the absolute values of the differences between the image element signals recorded in the mutually corresponding bits in the shift registers 19 and 20; This signal is imparted to the load terminal LD of the register 24 as the coincidence signal.

Also, the construction shown in FIG. 8 is so constructed that, in the course of the products of the image element signals recorded in the mutually corresponding bits $A_1-B_1, \ldots A_N-B_N$ in the two shift registers 19 and 20 are added together with respect to all of N bits and the shift register 20 being shifted with the shift register 19 being held, the recorded values in the shift registers 19 and 20 may be regarded as coincided when the added value of the products has become maximum. In FIG. 8, reference numeral 43 designate a multiplication circuit comprising N numbers of multipliers $43_1-43_N$ corresponding to the number of bits in the shift registers 19 and 20. Each of the multipliers $43_1-43_N$ calculate the product of the image elements signals recorded in the mutually corresponding bits $A_1-B_1, \ldots A_N-B_N$ in the shift registers 19 and 20, and those products are all added together and applied to the comparator 44 as the input. This comparator 44 compares an output from the multiplication circuit 43 with the predetermined reference voltage $V_{ref}$, and products a "high" level signal when the voltage level of the output from the multiplication circuit 43 has become higher than the reference voltage $V_{ref}$.

The example of the construction shown in FIG. 8 adopts the method of obtaining the correlation between two signals. The correlation between two signals exhibits a very sharp peak when the two signals have become coincident. And thus, if the reference voltage $V_{ref}$ in the comparator 44 is suitably selected, it enables a value approximate to a true maximum value, if not the true maximum value itself, to be detected and the "high" level signal from this comparator 44 is sufficiently applicable as the aforementioned coincidence signal.

Next, reference is made to FIGS. 9 and 10 to describe another embodiment of the present invention. The embodiment shown in FIGS. 9 and 10 differs from the embodiment of FIG. 2 in that the pair of photosensor arrays 12 and 14 are replaced by a single photosensor arrays. Accordingly, these Figures illustrate only the essential parts which differ from the construction in the above-described embodiment, and those components have similar reference numerals and symbols. Also, the description is directed only to these reference characters and description is only made of the differences from the above-described embodiment.

In FIG. 9, a pair of image focussing lenses 11 and 13 are fixedly disposed at the distance of the base line length d as already described, and a single photo-sensor array 48 comprising L members of photo-sensors $48_1-48_L$ for the lenses 11 and 13 (L is a number sufficiently greater than 2 N and may be, for example, $L=N+M$ in view of the embodiment described in connection with FIG. 2). In that case, image $I_1$ of an object by lens 11 is always formed at a substantially fixed position on the first sensor region 48a including initial N numbers of sensors $48_1-48_N$ of the sensor array 48 through an obliquely disposed stationary mirror 45 and a reflecting surface 47a of a reflecting prism 47 (thus, the set of the lens 11 and the first sensor region 48a is used for collimating to the object as in the previous embodiment). On the other hand, an image $I_2$ of the object by the lens 13 has its optical layout determined to be formed at a position corresponding to the distance to the object on the second sensor region 48b including (L-N) numbers of sensors $48_{N+1}-48_L$.

According to such arrangement, if an object is at the infinity, the image of the object by the lens 13 is formed at a position $I'_2$ in the second sensor region 48b (within the range of the sensors $48_{N+1}-48_{2N}$) following the path indicated by a broken line. In contrast, if the object is at a finite distance, the image thereof is formed at a position $I_2$ following the path indicated by a solid line in accordance with that distance.

Therefore, as already mentioned, the distance to the object may be detected by obtaining the amount of relative deviation x of the position forming of the image $I_2$ with respect to the forming position of the image $I'_2$ of the object at the infinity. In order to find out this deviated quantity x, the present embodiment, when the image element signals from the individual sensors $48_1-48_L$ in the sensor array 48 are taken out time-sequentially, the image element signal train from the N numbers of sensors $48_1-48_N$ in the first sensor region 48a is first applied to the first recording means, then the image element signal train from the same number of sensors in the second sensor region 48b to be subsequently produced as an output is introduced as an input to the second recording means to thereby sequentially shift the image element signal train in the second recording means, and the amount of shift from initiation of this shifting to a state in which the recorded values in the two recording means can be regarded as substantially coincided is counted and the value so counted is made provide the abovementioned amount of deviation x, i.e., the distance information to the object. Reference wil now be had to FIG. 10 to describe a specific circuit arrangement. The arrangement of FIG. 10 differs from that of FIG. 2 in that one sample and hold circuit is provided (indicated by 17), and AND gate 59 similar to the AND gate 50 provided for the shift register 19 is interposed between a pulse generating circuit 16 and a shift register 20, and the control signal (output c in FIG. 3I) imparted from the control circuit 21 to the AND gate 50 is inverted through the inverter 49 to be applied to the AND gate 59.

According to such a construction, of the first to the K'th reference clock pulses (output a) produced from the pulse generating circuit 16, only the first to $\alpha+N$th pulses are imparted to the shift register 19, while only the $(\alpha+N+1)$th to the Kth reference clock pulses are supplied to the shift register 20. On account of this, even if the data line for the sample and hold circuit 17 of the shift registers 19 and 20 is in common, the image element signals from the N numbers of sensors $48_1$–$48_N$ in the first sensor region 48a are applied only to the shift register 19, while the image element signals from the N number of sensors in the second sensor region 48b are applied only to the shift register 20 and moreover, in the shift register 20, the image element signals are sequentially shifted by the reference clock pulses (output a) after the $(\alpha+2N+1)$th.

The other points of the arrangement and operation are entirely similar to those described above and need not be described.

As the coincidence detecting circuit 22, the circuit shown in FIG. 6 or 8 is applicable.

Also, where the construction as shown in FIG. 4 is employed as the pulse generating circuit 16, the value K to be counted by the counter 52 may be adjusted by the combination of closing and opening of the switches in the switching circuit 53 with the constant $\alpha$ and the total number L of the sensors in the sensor array 48 used taken into account.

Also, in the present embodiment, the counter 23 is once cleared at a time instant when the entire image element signals from the sensors $48_1$–$48_N$ in the first sensor area 48a have been recorded, whereafter the counter 23 newly starts counting as soon as the shift register 20 starts recording the image elements signals from the first photo-sensor $88_{N+1}$ in the second sensor region. This means that the count is done in excess of N in comparison with the previous embodiment. but when the value counted by the counter 23 is converted into the distance, it may be done by taking into consideration that the counter 23 the extra N count being taken into account.

Figure 11:
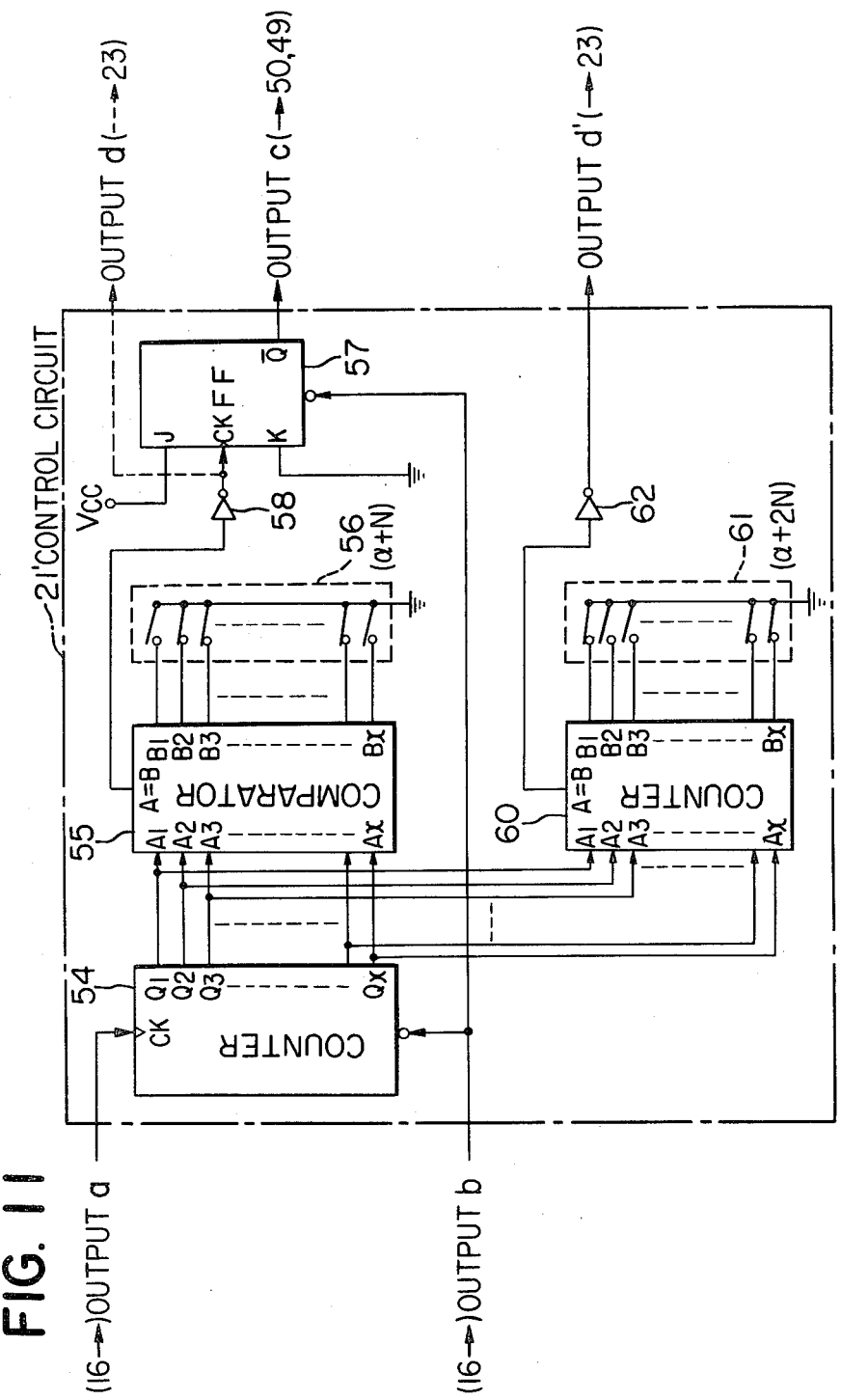
FIG. 11 shows another embodiment of a control circuit applicable to the circuit of FIG. 10.

Of course, this counter 23 may be cleared at a time instant when the shift register 20 has completed the recording of the image element signals from the initial N numbers of sensors $48_{N+1}$–$48_{2N}$ in the second sensor region 48b, and may be caused to start anew the counting from the time instant when the shift register 20 has effected 1 bit shift for the image element signal from the subsequent photo-sensor $48_{2N+1}$ and records the same, or in other words, from the $(\alpha+2N+1)$th reference clock pulses (output a). In such a case, the control circuit 21 may be of the construction as shown in FIG. 11. In other words, the control circuit 21' shown in FIG. 11 has a second comparator 60 and a second setting switch circuit 61 added to the construction of FIG. 5. If the constant $\alpha+2N$ is preset by the second switch circuit 61, the second converter 60 puts out a coincidence signal when the counted value of the counter 54 has reached the value $\alpha+2N$. After all, by arranging the coincidence signal from the second comparator 60 to be imparted as the clear signal (output d') to the counter 23 through the inverter 62, the counter 23 will be once cleared at a time instant when it has counted the $(\alpha+2N)$th reference clock pulse (output a), and will newly count from the $(\alpha+2N+1)$th reference clock pulse.

According to the invention, as described above, the two images of an object formed by a range finding optical system are electrically scanned by means of one or more photo-sensor arrays the resulting image scan signals relating these two images are relatively shifted in a shift register, and a relative shifting quantity which has been used up until the two image scan signals become most appropriately coincided each other is made the object distance information.

In the case of using this photo-sensor array however, a particular attention should be said to the following matters in view of the characteristics of the photosensors constituting such photosensor array. That is, of the aforementioned photosensor arrays, CCD or BBD, for example, is composed of charge storing type photo-sensor. This type of photo-sensor has such a property that, when light is irradiated thereto in a state of an electrical depletion layer being formed in it by application of a voltage to its electrode, a quantity of electric charge proportional to an incident light quantity thereto (light intensity x time) is accumulated in this depletion layer at a speed corresponding to the intensity of the incident light. Generally, this photosensor is used in such a manner as to obtain this accumulated charge as the image element signal depending on the as rated quanity of the incident light project into the photosensor during a period of from one discharge to the subsequent discharge in the next scanning hence, the abovementioned time may be recognized as charge accumulation time of each photo-sensor). In this instance, it is generally known to those skilled in the art that the amount of charge which the sensor can accummulate, i.e., the saturation level of the accumulated charge, is predetermined and that, when this saturation level is exceeded, an excessive charge overflows into the depletion layer of other photo-sensors. This disturbing phenomenon is well known as the so-called "blooming" in the art. Once there occurs this phenomenon, it becomes no longer possible to obtain proper image element signals.

Furthermore, when the amount of charge accummulated in a photo-sensor is extremely small, S/N ratio to dark current or the like becomes very low. Therefore, also in such a case, it is impossible to obtain proper image element signals.

On the other hand, when a self scanning type photo-diode array is used in a charge accumulation mode, if light is irradiated thereto in a state of the charge being saturated in the pn-junction capacitors, the charge in proportion to the quantity of incident light is discharged at a speed corresponding to the intensity of the incident light, and the accumulated charge quantity decreases (in this case, the photo-diode) functions as a charge accumulating and discharging In general, this photo-diode is used in such a manner as to obtain the charge current as the image element signal, which flows in such a manner that the charge may be releawed in correspondence to the integrated quantity of the light projected into the photo-diode during a time period of from one full charging up to the saturation level to the subsequent recharging to the saturation level in the next scanning, and that, in the recharging, it offsets the decreased charge due to the previous discharging (therefore, the above-mentioned time is considered as the discharging time of each the photo-diode). Of course, the capacity of each the photo-diode is given preliminarily. Therefore, to each the photo-diode there is given a maximum level of integrated amount of light that is determined depending upon the capacity of said photo-diode. When the level is exceeded, the charge stored in a photo-diode up to the saturation of its capacity will be discharged completely from it, but there can never occur any further discharge beyond the limit. As a result, the amount of charge current flowing in the next charging cycle corresponds to the capacity of the photo-diode, but never to the integrated amount of the incident light to it. This results in producing an improper image element signal.

Furthermore, when the charge discharge from such a photo-diode is extremely small, the charge current flowing at the time of charging also becomes very weak and therefore S/N ratio to the dark current or the like is reduced to an extremely low level. In such a case, it is again impossible to obtain a proper image element signal.

Accordingly, it is now understood that when the above described photo-sensor array comprising charge storing type or charge accumulating and discharging type of photosensors is used in a range detecting apparatus according to the teachings of the present invention a particular consideration is required to produce always proper picture element signals. More particularly, a proper adjustment of the amount of light received by the photo-sensors (light receiving time) in accordance with brightness of object so that the charge accumulated in or discharged from each photo-sensor may not exceed the above mentioned maximum level, but may attain a sufficiently high S/N ratio i.e., an adequate image element signal may always be obtained irrespective of any change in brightness of the object from time to time. Otherwise, highly precise range detection using such photo-sensor array of the above-described types would become no longer expectable.

In the following, explanations will be given in reference to FIGS. 12 and 13 to a modification of the pulse generating circuit 16, in which the light receiving time of the photo-sensor array 12, 14 or 48 is made automatically controllable depending upon brightness of object.

Figure 12:
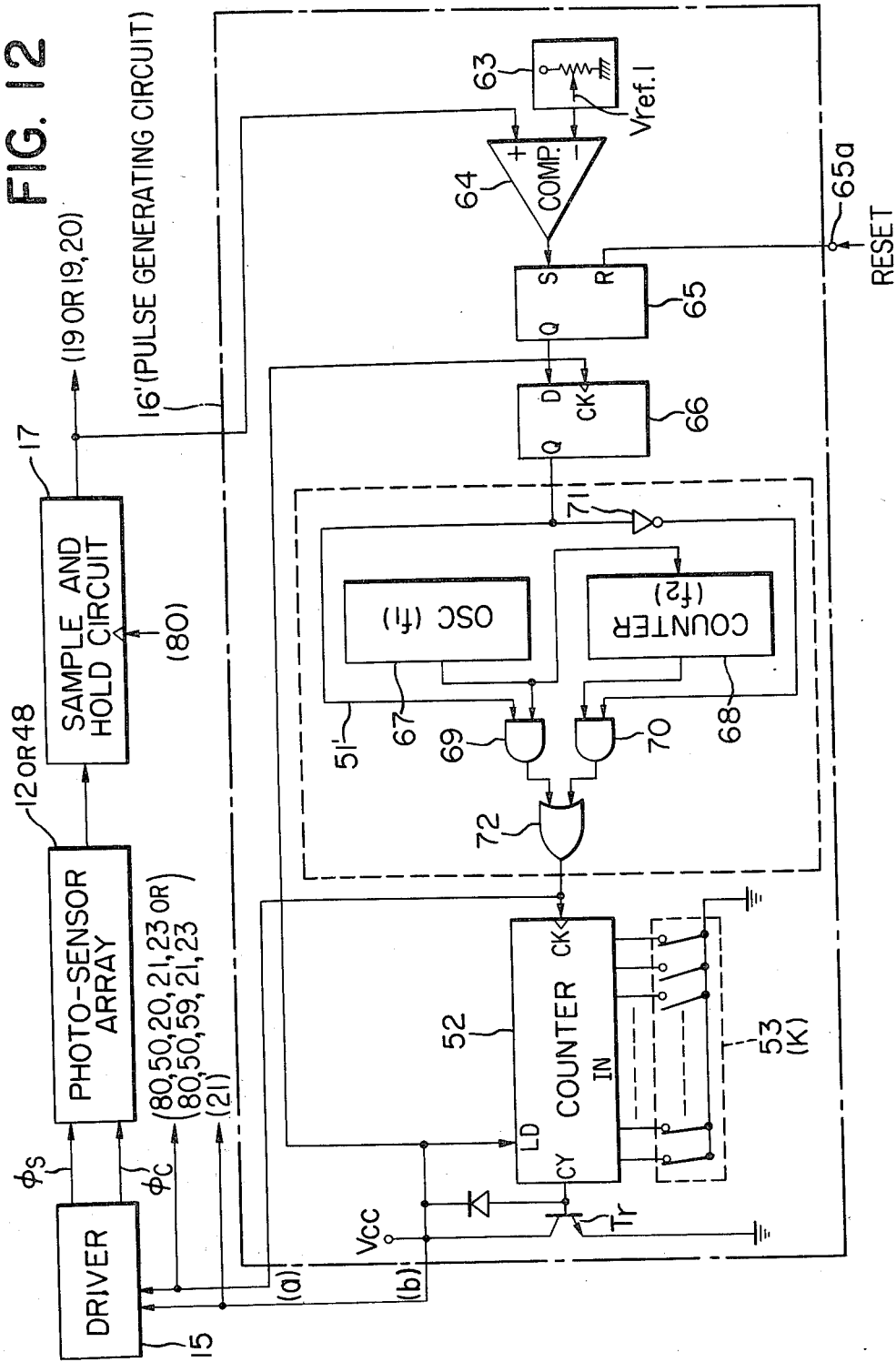
FIG. 12 shows an embodiment of the pulse generating circuit which can automatically regulate the light-receiving time of the sensor array in accordance with the brightness of the object.

Referring first to FIG. 12, the reference numeral 16' designates generally a modified pulse generating circuit. The circuit elements designated by the same reference numerals and characters as used in FIG. 4 correspond to those in the embodiment of FIG. 4. The pulse generating circuit 16' is applicable to either of the embodiments shown in FIGS. 2 and 10. Therefore, these modifications will be used for the explanations hereinafter.

In the pulse generating circuit 16' illustrated in FIG. 12, the reference voltage setting circuit designated by 63 has set therein a voltage $V_{ref.1}$ somewhat lower than the saturation level of each photo-sensor in the photo-sensor array 12 or 48. An output from the sample and hold circuit 17 is compared with the reference voltage $V_{ref.1}$ by a comparator 64. The comparator is so designed that, when the output from the sample and hold circuit 17 exceeds the reference voltage $V_{ref.1}$ (cf. waveform in FIG. 13F), a high level signal output is produced therefrom (FIG. 13G).

Responding to the high level signal from the comparator 64, an RS type flip-flop 65 produces a corresponding high level signal from its Q output terminal (FIG. 13H). 65a designates a reset terminal thereof.

A D-type flip-flop 66 receives the high level signal input from the flip-flop 65, after which it produces a corresponding high level signal output from its Q output terminal (FIG. 13I) in synchronism with the reference pulse (output b—FIG. 13B) that is produced at the collector side of the transistor Tr by the carry signal coming from the counter 52.

51' is an oscillation circuit which corresponds to the oscillator 51 in FIG. 4. The oscillation circuit 51' comprises an oscillator 67, a frequency dividing circuit, or a counter, 68, AND-gates 69 and 70, and an OR-gate.

The oscillator 67 produces a reference clock pulse of a given frequency $f_1$ and the counter 68 divides the frequency $f_1$ into a lower frequency $f_2$. The AND-gate 69 recieves the Q output of the flip-flop 66, and produces the reference clock pulse output from the oscillator 67 when the Q output becomes "high". Another AND-gate 70 receives the output of the flip-flop 66 through an inverter 71, and produces the reference clock pulse output from the counter 68 when the output of the inverter is "high", i.e., when the Q output from the flip-flop 66 is "low". The OR-gate 72 gives the driver 15 the outputs from the AND-gates 69 and 70.

The operation of the circuit is as follows:

When none of the outputs from the photo-sensors in the photosensor array 12 or 48 exceeds the reference voltage of $V_{ref.1}$ set in the reference voltage setting circuit 63 at the time of scanning an image plane, the output from the comparator 64 remains "low", hence the Q outputs of both flip-flops 65 and 66 also remain "low". As a result, in the oscillation circuit 51', AND-gate 69 remains off and another AND-gate 70 is turned on due to the "high" output from the inverter 71, whereby the output from the counter 68, that is, the reference clock pulse of frequency $f_2$ is produced as an output a. Therefore, to the driver 15, there is applied the reference clock pulse of frequency f (output a) and the other reference clock pulse (output b) to be generated at every K numbers of the former pulses (output a), thereby, a relatively low speed scanning is carried out under this state of operation (accordingly, the charge accumulation time of each photosensor in the sensor array 12, 14 or 48 is relatively long due to the long cycle interval of start pulse generation).

On the contrary, when the output from the sample and hold circuit 17 exceeds the reference voltage $V_{ref.1}$ during scanning as shown in FIG. 13F, the output from the comparator 64 assumes the "high" level as shown in FIG. 13G in response to which the Q output of the flip-flop 65 also becomes "high" as shown in FIG. 13H. The flip-flop 66 which receives the "high" level output from this flip-flop 65 takes the "high" level in its Q output in response to the reference pulse (output b—FIG. 13B) to be generated at the collector side of the transistor Tr at the start of the next scanning, as shown in FIG. 13I. Therefore, the output from the inverter 71 assumes the "low" level which turns the AND-gate 70 off, and simultaneously turns the other AND-gate 69 on. As the result, as shown in FIG. 13A, from the OR-gate 72, there is produced the output of the oscillator 67, i.e., the reference clock pulse of frequency $f_1$ as an output a with the consequence that, to the driver 15, there are applied the reference clock pulse of frequency $f_1$ (output a) and the reference pulse (output b) to be generated at every K numbers of the former pulses (output a). Under this state of operation, as will be understood from FIGS. 13C, 13D and 13E, the scanning cycle interval of the sensor array 12, 14 or 48 becomes shorter, and the charge accumulation time is reduced. The rate of this reduction in charge accumulation time directly corresponds to the rate of change in frequency of the reference clock pulse (output a), if the frequency is set, for example, at $f_1 = 2f_2$, it becomes $\frac{1}{2}$, and if at $f_1 = 4f_2$, it becomes $\frac{1}{4}$.

Thus, according to the modification of the pulse generating circuit shown in FIG. 12, it becomes possible to prevent beforehand the accumulated charge in each photosensor from reaching its saturation level. Namely, when the object is very bright, the frequency of the reference clock pulse (output a) applied to the driver 15 becomes higher, and the generating time interval of the reference pulse (output b) is reduced accordingly, which brings forth a corresponding reduction in the scanning cycle interval i.e. the charge accumulation time of each photosensor in the photosensor array 12, 14 or 48.

In the embodiment of FIG. 12, the oscillation circuit 51' is shown and described as a circuit comprising an oscillator 67 for generating the reference clock pulse of frequency $f_1$ and a counter 68 for generating clock pulse of frequency $f_2$ by frequency-dividing the clock pulse of $f_1$ so that, depending upon whether the Q output of the flip-flop 66 is "high" or "low", any one of the two outputs from the oscillator 67 and counter 68 may selectively be used. However, the circuit 51' is not limited only to the above-described arrangement, but as V-F converter (voltage-frequency converter) which is known to produce a clock signal of a frequency corresponding to an input voltage may be used. In this case, the circuit may be constructed with a first voltage generating circuit and a second voltage generating circuit. The first one generates a voltage $V_1$ corresponding to the aforementioned frequency $f_1$ and the second circuit generates another voltage $V_2$ corresponding to $f_2$. These two voltage generating circuits are connected with the input terminal of the V-F converter so that either one of the output voltage from the first and second voltage generating circuits can be applied selectively to the V-F converter depending upon whether the Q output of the flip-flop 66 is at the "high" or "low" level.

While in the modification of pulse generating circuit shown in FIG. 12 the interval of the reference pulse (output b) generation time is varied by changing the frequency of the reference clock pulse (output a), thereby adjusting the light receiving time of the sensor array 12, 14 or 48. Besides it is also possible to make an adjustment of the light receiving time by changing the generating time interval of the reference pulse (output b) only without changing the frequency of the reference clock pulse (output a). This is done by automatically changing the set value at the count value setting switch circuit 53 for the counter 52 in FIG. 12. For example, some numbers of the switches in the switch circuit 53 are removed and, instead, the setting value input terminals of the counter 52 corresponding to these removed switches are connected to the Q output terminal of the flip-flop 66 so that, the set count value for the counter 52 may become K when the Q output is low whereas it may become K' (but, $K > K' \geq a + M$ or $K > K' \geq a + L$) when high. By doing so, the set count value for the counter 52 becomes K or K' depending upon whether the Q output of the flip flop 66 is "low" or "high". Therefore, only the time interval of generation of the reference pulse (output b) is changed, while the frequency of the reference clock pulse (output a) remains unchanged whereby the light receiving time of the sensor array 12, 14 or 48 is automatically adjusted.

In the pulse generating circuit 16' shown in FIG. 12, changeover of the frequency of the reference clock pulse (output a) from $f_1$ to $f_2$ can be done by applying a "high" signal to the reset terminal 65a of the flip-flop 65. This supply of "high" level signal to the reset terminal may be advantageously interlocked with a shutter charging operation, etc., when the range detecting apparatus according to the present invention is incorporated in a photographic camera, as to focus detecting or automatic focus adjusting device. Alternatively, there may be used an automatic switching method, in which the frequency is automatically changed over from $f_1$ to $f_2$ when the object brightness becomes dark. This will be explained hereinafter referring to FIGS. 14 and 15A to 15K.

Referring first to FIG. 14, an automatic resetting circuit is generally designated by 73. A peak hold circuit 74 sequentially holds the peak values of the output from the sample and hold circuit 17 (FIG. 15F). 75 designated a switch for clearing off the peak value which the peak hold circuit 74 is holding (FIG. 15G) by being turned on in response to a control signal output produced from the shift register 76 after lapse of a certain delay time of $\tau_1$ (for frequency = $f_1$) or $\tau_2$ (for frequency = $f_2$) from the time instant of generation of the reference pulse (output b—FIG. 15B) from the pulse generating circuit 16'.

A sample and hold circuit 77 functions to sample and hold therein an output from the peak hold circuit 74 which is so set as to introduce the output from the peak hold circuit 74 in response to the reference pulse (output b) from the pulse generating circuit 16', and holds it until the next reference pulse (output b) is applied.

79 refers to a reference voltage setting circuit, in which a voltage $V_{ref. 2}$ to determine a level for restoring the pulse generating circuit 16' to its original state i.e., for resetting the frequency of the reference clock pulse (output a) from $f_1$ to $f_2$. A comparator 79 compares the output (FIG. 15H) coming from the sample and hold circuit 77 with the above reference voltage $V_{ref. 2}$. When the former becomes lower than the latter, the comparator 79 produces a high level signal output, i.e., it applies a reset signal (FIG. 15I) to the reset terminal 65a of the flip-flop 65 in the pulse generating circuit 16'.

The operation of the above described automatic resetting circuit is as follows:

Provided that the frequency of the reference clock pulse (output a—FIG. 15A) produced from the oscillation circuit 51' in the pulse generating circuit 16' is $f_1$ and that the hold value (FIG. 15G) of the peak hold circuit 74 is higher than the reference voltage $V_{ref. 2}$, the output of the sample and hold circuit (FIG. 15H) is naturally higher than the reference voltage, $V_{ref. 2}$, even when the sample and hold circuit 77 introduces thereinto the output from the peak hold circuit 74, and transmits the same to the comparator 79, at the start of the subsequent scanning. As the consequence, the output from the comparator 79 (FIG. 15I) becomes "low" and the pulse generating circuit 16' is not reset. In contrast to this, when the hold value in the peak hold circuit 74 becomes lower than the reference voltage $V_{ref. 2}$, as shown in FIG. 15G, the sample and hold circuit 77, introduces thereinto the output from the circuit 74 at the start of the next scanning, as shown in FIG. 15H, and, when it transmits the output into the comparator 79, the output from the comparator 79 becomes "high" as will be seen from FIG. 15I, whereby a reset signal is produced. As the result, as shown in FIG. 15J, the flip-flop 65 in the pulse generating circuit 16' is reset at once and its Q output becomes "low". This low level signal is received by the flip-flop 66 and, as shown in FIG. 15K, the Q output thereof becomes low in response to the reference pulse (output b) applied thereto at the next scanning. Accordingly, in the oscillation circuit 51' in the pulse generating circuit 16', AND gate 69 is turned off and AND gate 70 is turned on. Finally, the frequency of the reference clock pulse (output a) to be applied to the driver 15 is switched over from $f_1$ to the original frequency $f_2$, as shown in FIG. 15A. Thus, according to the combination of the pulse generating circuit 16' shown in FIG. 12 and the automatic resetting circuit 73 shown in FIG. 14, it is possible to always obtain image scan signals at a proper level in good consonance with change in brightness of the object, even if said change occurs during the range detecting operation. Therefore, this is advantageously applicable to the aforementioned range detecting apparatus.

The range detecting method and apparatus of the present invention described above in detail are directly applicable to automatic focus adjusting system in the optical instrument such as camera. Examples of such application of the present invention will be described hereinbelow.

Figure 16:
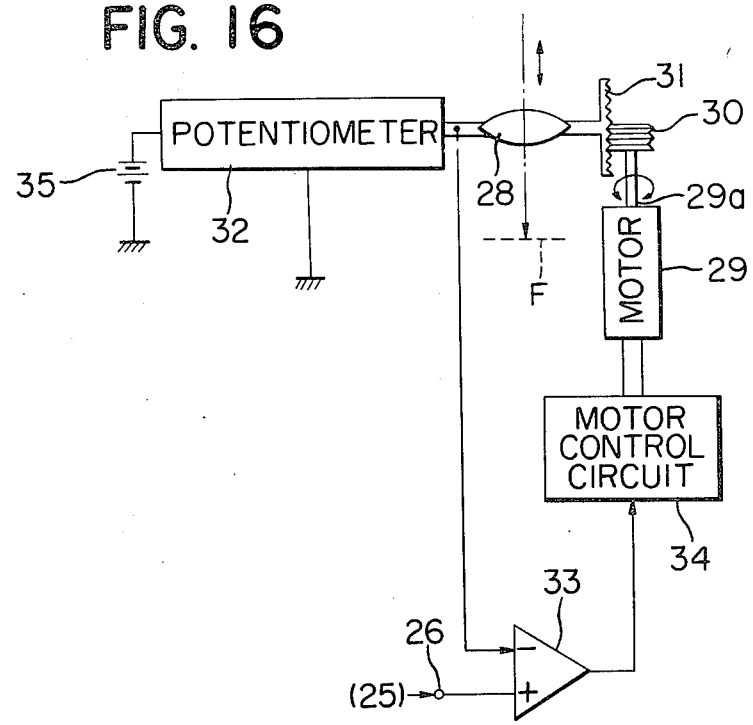
FIG. 16 is a schematic diagram of an embodiment wherein the range finder of FIG. 2 or 10 is applied to an automatic focusing system for an optical machine, such as a camera.

FIG. 16 illustrates an application form of the invention in which an object distance signal issued from the D/A converter 25 in the apparatus of FIG. 2 embodiment is used to servo-control the photographing (taking) lens of a camera.

In FIG. 16, the reference numeral 28 designates a photographing lens to be brought in focus to an object. 29 refers to a driving motor for adjusting the position of the lens 28 along its optical axis. The motor is connected with a rack 31 fixed to the photographic lens 28 thorugh a worm 30 fixed to the motor output shaft 29a. Mechanically connected with the lens 28, is a potentiometer 32, which is connected with one input terminal of a differential amplifier 33. The other input terminal of the amplifier 33 is connected to the output terminal 26 of the D/A converter 25 in FIG. 2.

34 is a motor controlling circuit for controlling the motor 29 using the output from the amplifier 33, 35 designates an electric power source, and F is a film surface.

The operation of the above described apparatus is as follows:

When the range detecting apparatus shown in FIG. 2 or FIG. 10 completes detection of the object distance and an output from the D/A converter 25 is applied to the differential amplifier 33 through the output terminal 26 of the converter, the amplifier 33 produces an output in accordance with a difference between a signal of the object distance from the converter 25 and a signal from the potentiometer 32 corresponding to an adjusted position of the lens 28, whereby, the motor controlling circuit 34 determines the rotational direction of the motor 29 in accordance with polarity of the output from the amplifier 33 to start adjustment of the lens 28 by the motor.

During this adjustment of the lens 28, when the signal from the potentiometer 32 becomes coincided with the signal from the converter, the output from the amplifier 33 becomes zero, and the motor controlling circuit 34 stops the motor 29 stop. At this time, therefore, the lens 28 is accurately focussed to the object, and a very clear image of the object is formed on the film surface F.

Figure 17:
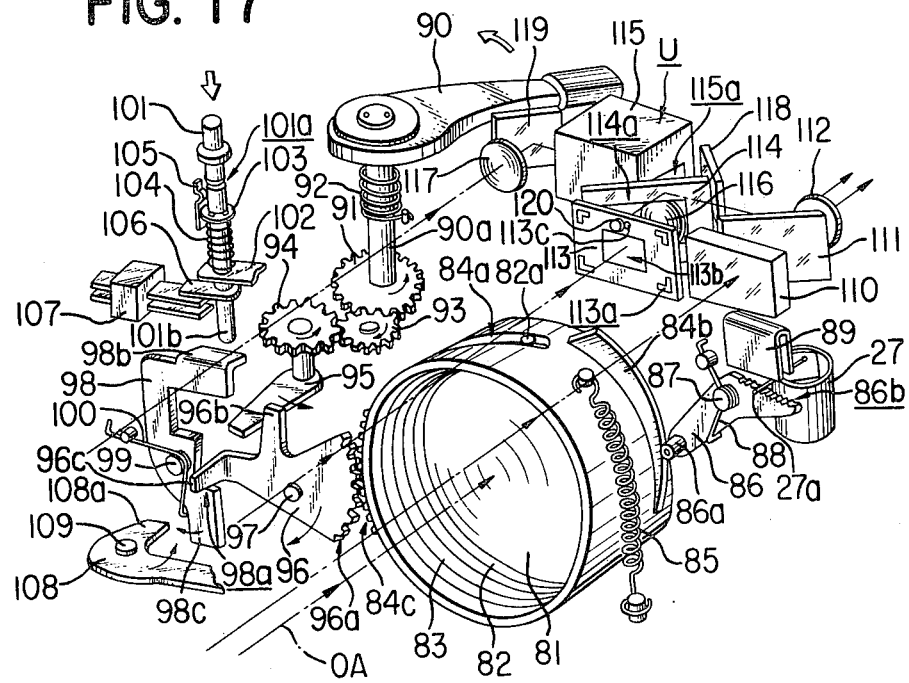
FIG. 17 is a perspective view of a mechanism of an embodiment wherein the range finder of FIG. 2 is incorporated into an automatic focussing system of a photographic camera.

FIG. 17 shows an actual construction of an automatic focus adjusting system in a photographic camera, in which the deviation of the pointer 27a of the meter 27 acting as a final output means in the embodiment of FIG. 2 is used to effect the automatic adjustment of the photographic lens at a designated position by the pointer.

In FIG. 17, a taking lens 81 is held by a lens holder 82 which is in turn slidably held in a stationary tube 83. Rotatably fitted on the outer circumference of the tube is a lens driving ring 84 provided with a helical slot (or cam slot) 84a for moving the lens 81 along its optical axis OA, a cam piece 84b for indicating the adjusting position of the lens 81 and a gear part 84c. The ring 84 is energized by a coil spring 85 to rotate clockwise, in the drawing, about the optical axis as the center of rotation. A follower pin 82a embedded in the outer peripheral surface of the cylindrical lens holder 82 passes through an axial guide slot (not shown) perforated in the tube 83, and is engaged with helical slot 84a. Therefore, a rotation of the driving ring 84 causes the lens 81 to move along the optical axis OA together with its holder 82.

A stop lever 86 is used to stop the ring 84, hence the lens 81, at a position designated by the pointer 27a of the meter 27. For this purpose, the stop lever has a follower 82a abutting against the cam piece 84b of the ring 84 and a gear part 86 to be engaged with the pointer 27a. Furthermore, the lever 86 is pivotally supported by a pin 87 and energized by a spring 88 to rotate clockwise about the pivot pin as viewed in the drawing, in which direction the follower 86a abuts against the cam piece 84b. To prevent a further counter-clockwise rotation of the stop lever 86 when the gear part 86b comes into engagement with the meter pointer 27a, there is provided a limiting member 89. This limiting member is of U-shape and positioned at the closest possible position to the meter pointer 27a so that it may permit free swinging of the pointer and causes the stop lever 86 to cease further rotation of a time when the gear part 86b thereof comes into engagement with the meter pointer 27a and thereby the pointer is abutted against the limiting member 89.

90 is a camera charge lever which is connected with a shutter charge mechanism (not shown) and a film winding mechanism (not shown) though a gear 91 mounted on its shaft 90a. The charge lever 90 is energized by a winding spring 92 to rotate clockwise so that, whenever a photographer leaves his finger off the lever after a charge operation, it can automatically return to its starting position shown in the drawing.

Designated by 95 is a rotational lever for returning the lens. The rotational leveer 95 is connected with the above mentioned gear 91 through a gear 94 integrally formed on the lever 95 and an intermediate gear 93. The lever is so designed that, when the charge lever 90 is rotated in the direction of arrow, it rotates in the direction of arrow by the motion of gear train 91, 93 and 94. This rotation causes a sector gear 96 to rotate about its pivot 97 in the direction of arrow (clockwise) through its arm 96 meshed with the gear part 84c of the driving ring 84 at the gear part 96a, whereby the ring 84 is rotated counter-clockwise around the optical axis OA counter-clockwise up to the position shown in the drawing. By this counter-clockwise rotation of the ring 84, the spring 85 is charged.

Designated by 98 is a stop lever having a stepped portion 98b for receiving an angled arm 96c at the tail end of the sector gear 96 when the ring 84 is rotated in the above described manner by the sector gear 96. The stop lever is pivotally supported by a pin 99 and energized by a spring 100 to rotate counter-clockwise around the pin 99 as the center to receive the angled arm 96c thereby stopping the driving ring 84 through the sector gear 96.

The slot 84a on the ring 84 is so designed that, when the ring 84 is in its starting position shown in the drawing, the lens 81 is adjusted to the position whereat it is in focus to infinity and by a clockwise rotation of the ring 84 around the optical axis OA, the lens 81 is moved forward along the optical axis OA, i.e., toward a position whereat it becomes focussed to a shorter distance.

A camera release button 101 is supported by a stationary base plate 102 for slide movement in vertical direction as viewed in the drawing, and is energized upward by a coil spring 104 interposed between the base plate 102 and a washer 103.

Designated by 105 is a click spring to be engaged with a click groove 101a formed in one part of the release button in the course of depression of the button, thereby click-stop the button. The above mentioned spring 104 has a spring force sufficient to release the click stop of the release button 101 due to the click spring 105. 107 is an open-type power source switch built in the camera and connected to a range detecting unit to be later described. The power source 107 is so positioned that, when the click spring 105 is engaged with the click groove 101a at the time of depression of the release button 101, it may be thrown in by means of a switch closing member 106 mounted on the release button 101.

The above mentioned stop lever 98 has an angled portion 98b for receiving the tip end part 101b of the release button 101 during farther depression of the button beyond the position whereat the click spring 105 comes into engagement with the click groove 101a of the button 101. By the pressing down of the angled portion 98b by the fore end portion 101b, the stop lever 98 is urged to rotate clockwise about its axis 99 against the spring 100 so that the sector gear 96 is disengaged from the stepped portion 98a of the stop lever. Further, near the final stage of the release button depression, the tail end 98c pushes down the tail end portion 108a of the shutter release lever 108 so as to rotate the lever 108 around its axis 109 in the direction of arrow. As a result, the shutter (not shown) is released.

An objective lens 110, a half mirror 111 and an eyepiece lens 112 constitute a view finder optical system of the camera.

Designated by 113 is a mask plate which has four openings 113a for displaying a photographif field within the camera finder and one opening 113b for defining a range detection field. Though not shown in the drawing, the four openings 113a are covered with a light transmissive film colored, for example, in yellow.

Behind the mask plate 113, there is slantly disposed a mirror 114 to deflect the four light coming through the openings 113a toward the half mirror 111. The mirror 114 has an opening 114a corresponding to the abovesaid opening 113b.

In such arrangement of the camera as described above, a range detecting apparatus of the present invention as shown, for example, in FIG. 2 is packaged in a package box 115 in a very compact form, and incorporated as a unit U.

The box 115 has two openings formed in both left and right side walls (only the right side opening 115a is shown in FIG. 17). The photo-sensor arrays 12 and 14 shown in FIG. 2 are disposed within the box 115 facing the right and left openings respectively. Lenses 116 and 117 correspond to the lenses 11 and 13 shown in FIG. 1 or 2. Particularly, the lens 116 is disposed behind the mirror 114 facing its opening 115a so as to receive the object light coming through the openings 113b and 114a and to form a reference image of the object. Therefore, the field of the lens 116 is much more restricted than that of the lens 117 to form a comparative image of the object.

A numeral 118 refers to a mirror 118 slantly disposed behind the lens 116 to cause the reference image formed by the lens 116 to be received in the sensor array 12 disposed in confrontation to the opening 115a in the right side wall of the box 115. A numeral 119 designates a mirror slantly disposed behind the lens 117 to cause the comparative image formed by the lens 117 to be received in the sensor array 14 disposed in conofrontation to the left side opening (not shown) of the box 115.

Designated by 120 is a light emitting diode for indicating completion of a range detection in the range detecting unit U. The diode 120 is disposed in confrontation to a small hole 113c formed in the upper middle portion of the mask plate 113 so that the indication light emitted from the diode may impinge upon the half mirror 111 through the mirror 114. In order to make it possible to distinguish the light emitted from the diode 120 from the yellow colored light coming through the openings 113a for indicating the photographing field of view, the light emitting diode preferably emits red or blue light. This light emitting diode is controlled by a control circuit such as shown in FIG. 18.

Figure 18:
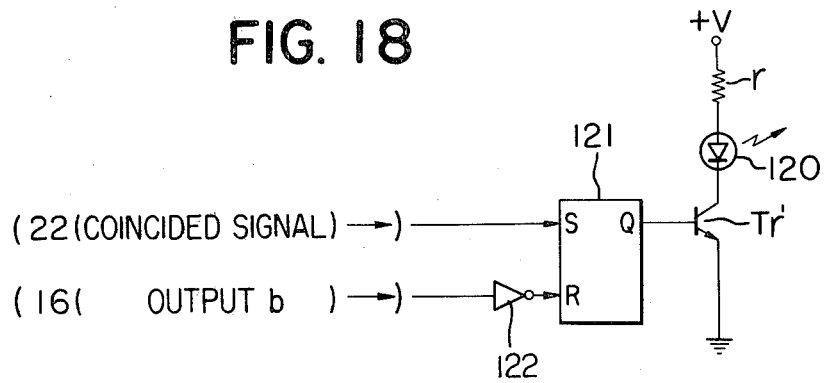
FIG. 18 is a schematic diagram of an embodiment of a display circuit for displaying the termination of the range finding operation of the automatic focussing system of FIG. 17.

Referring to FIG. 18 the reference numeral 121 designates a flip-flop which receives at its set input terminal S an output of the coincidence detecting circuit 22 shown in FIG. 2, that is, a coincidence signal (FIG. 3L) and at its reset input terminal the reference pulse (output b—FIG. 3B) from the pulse generating circuit 16 (or 16') shown in FIG. 2 through an inverter 122. Tr' designates a transistor, the base of which is connected with Q output terminal of the flip-flop 121, and the emitter of which is connected to the ground. The light emitting diode 120 is connected, together with a protective resistance r, with the collector of the transistor Tr'.

In the circuit of such arrangement, the flip-flop 121 is in a reset condition at the start of the range detection, and its Q output assumes the "low level". Therefore, the transistor Tr' is non-conductive and the light emitting diode is in the "off" state. When the coincidence detecting circuit 22 detects a coincidence of the contents in the shift registers 19 and 20 in the course of the range detection, and produces the coincidence signal output (FIG. 3K), the flip-flop 121 is set and its Q output is changed over from "low" to "high" whereby, the transistor Tr' becomes conductive. At this time instant, the light emitting diode 120 is turned on to indicate termination of the range detection. Thereafter, the flip-flop 121 is reset when the reference pulse (output b—FIG. 3B) is produced from the pulse generating circuit 16 (or 16'). Since Q output of the flip-flop changes from "high" to "low", the transistor Tr' turns off and also the light emitting diode 120 puts out.

The operation of the photographic camera shown in FIG. 17 is as follows:

To get ready for taking a picture, the camera charge lever 90 is rotated in the direction of arrow by hand, whereupon the gear 91 rotates and the shutter charging and film winding up mechanisms (not shown) are actuated. At the same time, the rotating lever 95 is rotated in the direction of arrow through the gears 93 and 94, whereby the sector gear 96 rotates in the direction of arrow through the arm 96b. As a result, there is caused a counter-clockwise rotation of the driving ring 84 about the optical axis OA.

When the ring 84 reaches the position shown in the drawing, the lens 81 is set at a position to be focussed to the infinity and the spring 85 is sufficiently charged, the stop lever 98 is engaged with the angled arm 96c of the sector gear 96 at the stepped portion 98a of the lever by the action of the spring 100, whereby the driving ring 84 is stopped at the position shown in the drawing. Now, the camera is ready for taking a picture.

After getting ready for taking a picture in a manner as described above, the photographer collimates the camera to an object, while viewing the view-finder, so that a desired object may be within the frame of the photographic field defined by the four openings 113a in the mask plate 113. During this operation, the lens 116 forms a reference image on the sensor array 12, and the lens 117 forms a comparative image on the other sensor array 14 with a relative positional parallax corresponding to the distance from the camera to the object as will be understood from the explanation previously made referring to FIG. 17. The reference image is an image at the center part of the object which is produced by the light coming through the opening 113b for defining the distance field in the mask plate 113 and the opening 114a in the mirror 114, and being directed to the sensor array 12 through the mirror 118. As already mentioned, the sensor array 12 is disposed within the box 115 facing the right side opening 115a. The comparative image formed by the lens 117 is an image of the object covering a wider area of object than that of the reference image. The comparative image is formed on the sensor array 14 through the mirror 119, disposed within the box 115 facing its left side opening.

Now, in order to conduct photo-taking operation in this state, the photographer pushes the release button 101 down at first up to the position where the click spring 105 comes into engagement with the click groove 101a on the release button. At this time, the switch 107 is closing the circuit by the switch throw-in element 106 to supply an electric power to the range detecting unit U from a power source (not shown), whereby the unit starts the range detecting operation same as previously described relating to the apparatus of FIG. 2. When the range detection is completed by the unit U, namely, when a coincidence signal output (FIG. 3K) is produced from the coincidence detecting circuit 22 shown in FIG. 2, the light emitting diode 120 puts on in the view-finder to. This indicates termination of the range detection as already described in reference to FIG. 18. At this time, the pointer 27a of the meter 27 also shows a deviation corresponding to the object distance, depending upon the output from the D/A converter 25 shown in FIG. 2. At the time instant when the light emitting diode 120 puts on, the operator pushes the release button 101 farther down, whereupon the stop lever 98 is rotated clockwise, in the drawing, about the pivot pin 99 as the center by the tip end 101b of the release button 101 against force of the spring 100, whereby the sector gear 96 is disengaged from its stop engagement with the stop lever. As the consequence the driving ring 84 rotates clockwise under the action of the spring 85 around the optical axis to cause the lens 81 to be moved forward along the optical axis QA through the pin 82a engaged in the slot 84a of the drive ring 84.

On the other hand, when the drive ring 84 is rotated by the force of the spring 85, the stop lever 86 is rotated counter-clockwise by the cam piece 84b on the outer circumference of the ring about its pivot pin 87 against the spring 88. Further, when the gear part 86b of the stop lever 86 comes into engagement with the meter pointer 27a to cause it to collide against the restricting member 89, further rotation of the stop lever 86 is prevented and the driving ring 84 is stopped. As the result, the lends 81 is set to the forwarding position indicated by the meter pointer 27a i.e. the position corresponding to the object distance.

Therefore, at the time of stoppage of the forward movement of the lens 81 a if of the release button 101 is further depressed, it actuates the release lever 108 through further rotation of the lever 98 to release a shutter (not shown), and a very clear and sharp image of the object is taken on the film (not shown).

Thereafter, by leaving the finger off the release button 101, it returns to its starting position shown in the drawing under the action of the spring 104. At this time, the switch 107 is opened and the power supply to the range detecting unit U is stopped, on account of which the unit becomes inoperative.

As will be clearly seen from the foregoing, the camera of FIG. 17 uses the range detecting apparatus shown in FIG. 2, and, particularly, it utilizes the points 27a of the distance indicating meter 27 as the final output means of the detecting apparatus, hence its construction is very simple, and very rapid and accurate automatic focus adjustment of the lens 81 becomes possible.

According to this construction, a depression of the release button 101 up to the intermediate position at which it is click stopped by the click spring 105 only causes the switch 107 to be closed, and does not cause the lens 81 to be released. If the photographer leaves his finger off the release button 101 at this instant, the switch 107 is opened and the distance information from the detecting unit U is cancelled. This means that the photographer can freely change the object to be photographed from one distance to another different in it is before releasing of the lens 81.

Both examples of the automatic focus adjusting system described above are of such type that adjusts the taking lens in accordance with the object distance represented by an output produced from the range detecting apparatus. However, with the range detecting method and apparatus of the present invention, it is also possible, by interlocking the taking lens with the lens 13 shown in FIG. 1 or 2, to obtain from the range detecting apparatus an information corresponding to the deviation of the set position, of the taking lens from an in-focus position at which the taking lens focuses the object image on the film plane. Therefore, making use of this information, the automatic focus adjustment of the taking lens can be attained also by bringing the lens to a position where the deviation becomes zero. An example of such modification will be explained in reference to FIG. 19.

Figure 19:
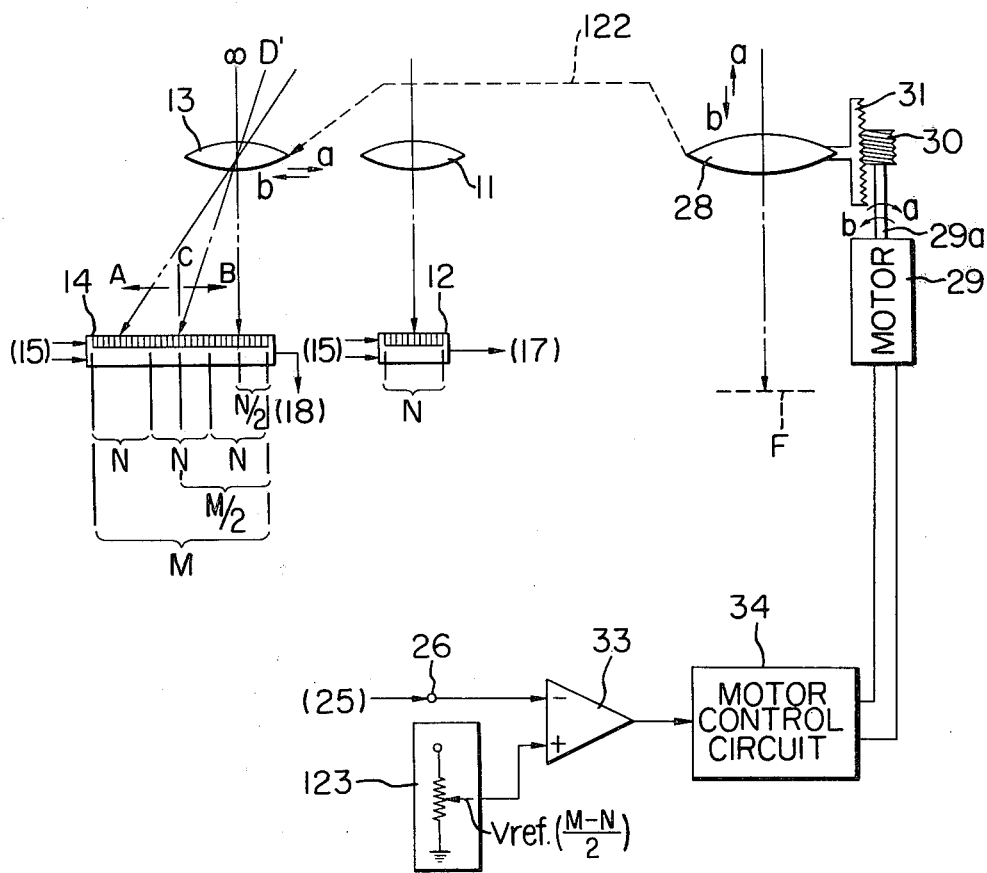
FIG. 19 is a schematic diagram of another embodiment wherein the range finder of FIG. 2 is incorporated into an automatic focussing system of an optical machine, such as a camera.

In FIG. 19, the same members and elements as those in FIGS. 1, 2 and 16 are designated by the same reference numerals and characters. For the sake of simplification of the drawing, these portions which overlap with those in FIG. 2 in construction are left out of this drawing.

Referring to FIG. 19, it is seen, as explained previously referring to FIG. 1, that the lens 13 is so disposed that just the center portion of image of an object at the infinity may be aligned with the center part of the sensor region comprising first (or the rightmost) H numbers of the sensors in the sensor array 14 (N is an even number). Let the distance of such object the image center of which is aligned with the center C of the sensor array 14 by the lens 13, be represented by D'. The object, the image center of which is positioned in the region leftward deviating from the center C, that is, the region indicated by arrow A, lies in a position nearer than the distance D'. On the contrary, when the center of image is positioned in the region rightward from the center C, that is, the region indicated by the arrow B, the object lies in a position farther than. Therefore, if the lens 13 is made movable in the direction of arrows a and b in the drawing, without it being fixed, and is linked with the taking lens 28 by a linking mechanism 122 as shown generally with a broken line in the drawing, maintaining the following relationship, i.e. when the lens 13 is adjusted to cause the image center of the object to align with the center of the sensor array 14, the taking lens 28 may be accurately focus adjusted to this object, the object is at a position of much shorter distance side to the then set distance of the phototaking lens 28 if the image center of the object to be formed on the sensor array 14 by the lens 13 is positioned in the region of the A side as shown by an arrow in the drawing, hence the phototaking lens 28 is in the "back-focus" state to this object. On the contrary, when the center of image focused by the lens 13 is in the area B, the taking lens 28 is at a position of a farther distance side with respect to the then set distance, hence the lens 28 is in a front focus state to this object.

In order that the image element signal train from the N numbers of sensors with the abovementioned center C of the sensor array 14 as the center thereof may be recorded in the shift register 20 in the course of the image scan signal recorded in the shift register 20 being shifted, just $M-N/2$ times of shifting counting from the time instant when the image element train from the initial (rightmost) N numbers of the sensor array 14 has been completely recorded in the shift register 20, as will be understood from the drawing. Therefore, if this value $M-N/2$ is subtracted from the counted value of the counter 23 at the time when the coincidence detection circuit 22 in FIG. 2 has detected the coincidence in the course of conducting the coincidence detection, while shifting bit by bit the image scan signal from the sensor array 14 as recorded in the shift register 20 with respect to the image scan signal from the sensor array 12 as recorded in the shift register 19, the positive or negative code of the result of the subtraction represents the directivity of the abovementioned deviation, i.e. whether it is the back focus (positive) or the front focus (negative), and the absolute value thereof denotes the deviated quantity. Incidentally, when the subtraction result is zero, this of course represents that the phototaking lens 28 is at the "in-focus" position.

From the above standpoint, the embodiment of FIG. 19 is so designed that a reference voltage Vref. corresponding to the value of $M-N/2$ is produced as an output in accordance with the equation $D=d.f/x$ explained previously in connection with FIG. 1 by a reference voltage setting, circuit 123, and this output voltage is applied to ⊕ input side of the differential amplifier 33, while applying an output voltage from the D/A converter 25 to its ⊖ input side.

According to such arrangement, the polarity of the output from the differential amplifier 33 can be used to indicate the direction of the above mentioned deviation i.e. the out-of-focus direction (the quantity of the deviation is, of course represented by the absolute value of the output). When the output from the amplifier 33 is applied to the motor control circuit 34 it drives the motor 29 drive in the direction of arrow a or b in accordance with the polarity of the output from the amplifier 23 so as to eliminate the deviation, whereby, the taking lens 28 is moved along its optical axis in the arrow direction a or b. In this instance the lens 13 is shifted through the connecting mechanism 122 in the arrow direction a or b in correspondence to the moving direction of the taking lens 28. When the center of the object image becomes coincided with the center C of the sensor array 14 during the shifting of the lens 13, the output of the differential amplifier 33 becomes zero. Therefore, the motor control circuit 34 stops the motor 29. At this time, the taking lens 28 is accurately focussed with the object.

In this manner, the arrangement illustrated in FIG. 19 attains the automatic focus adjusting of the taking lens 28. While, the range detecting apparatus shown in FIG. 2 is used for the arrangement of FIG. 19, it is also possible to use the range detecting apparatus shown in FIG. 10. In the latter mentioned case, however some adjustment is required regarding the control circuit 21. When the circuit 21' shown in FIG. 11 is used as the control circuit, a reference voltage corresponding to $L/2-N$ ($M=L-N$) may be generated from the reference voltage setting circuit 123. But when the circuit shown in FIG. 5 is used as the control circuit 21, the reference voltage setting circuit 123 has to be adjusted to produce a reference voltage corresponding to $L/2-2N$, taking into consideration that the counter 23 counts in excess of N as described above.

As described above, the present invention is so constructed that it detects, by, an entirely novel and pure electrical method of relative shifting of image scan signals the amount of relative deviation between two images to be formed with a relative positional parallax corresponding to the object distance, i.e. with a relative deviation in the focussed image position by adopting the range finding principle in the two image-coincidence type range finder. By this feature of the present invention, all the difficulties and disadvantages involved in this type of range detecting method and apparatus hitherto proposed such as deterioration of the range detection accuracy and complexity in structure are eliminated, where it becomes possible to always carry out a range detection always with high accuracy using a relatively simple arrangement of circuit.

In addition, since the present invention treats the analog data as they are, the detection can be very accurate as compared with conventional systems, while on the other hand, the processing circuit construction as a whole is simplified. Especially the circuit for detecting the coincidence may be simple, since it deals with the analog signals as the object of treatment. For these reasons, the present invention is advantageously applicable to an automatic focus-adjustment system for optical appliances such as cameras.

In a pair of photo-sensor arrays are used in the manner as shown in FIG. 2, the number of the sensor to be provided aboved be sufficient to cover the deviation found from the base line length between the lenses 11 and 13, focal length, photometering range, since the image on the photo-sensor 14 charges its position in accordance with the object distance. However, because of the fact that the image on the photo-sensor array 12 constitute reference, and can be formed at a substantially fixed position, the number of the sensor on the photo-sensor, array 12 can be less than that on the photo-sensor array 14.

As regards the detection of coincidence in the recorded values of the shift registers 19 and 20, it is desirable, as shown in the embodiment, to evaluate the data from all bits (i.e. N) in both of the shift registers 19 and 20. However, evaluation of increased number of bits results in complicated structure of the coincidence detection circuit 22, hence complicated wiring. In order to avoid this, it is practical to detect the coincidence between appropriate number of the bits in the N numbers of bits such as, for example, N/2 bits (every other bit), N/4 bits (at every three bits), or randomly selected bits.

For the photo-sensor array suitable for the present invention, CCD image sensor and self-scanning type photo-diode array are common and readily applicable. However, another possible way is to introduce an output from each photo-diode in an ordinary photo-diode array into an analog shift register to use it as a time-sequential signal.

Generally speaking each individual sensor element of, the commercially available CCD image sensor and self-scanning type photo-diode array has of $10\mu$–$50\mu$ in size, the size of which determines the accuracy in the distance detection. The smaller the sensor is, the more accurate becomes the distance information in response to minute movement of the image on the photo-sensor array. On the other hand, when the size of the sensor is increased, signal output becomes also large, but it can no longer follow minute changes in distance. However, in utilization of this large signal output, such large-sized sensor can be used for a zone focus system in camera, etc.

What we claim is:

1. A method of detecting a range of an object comprising the steps of:
   (A) deriving first and second images of the object along different sightlines;
   (B) electrically sensing the first and second images to produce electrical analog data for each image element of the first and second images;
   (C) storing the analog data of the first image on a first set of a plurality of N successive elements;
   (D) successively correlating the analog data of said second image on each of a plurality of different sets of N successive elements with the analog data of said first image on the N successive elements, said correlating step including successively storing, on one set by set basis, the analog data on each of said plurality of sets of the N successive elements of the second image;
   (E) successively storing the location, of each of the plurality of sets of the N successive elements of the second image whose analog data is correlated with the analog data on the N successive elements of the first image;
   (F) detecting, through said correlation step, a set of the N successive elements of the second image which can be regarded as being in substantial coincidence with the N successive elements of the first image; and
   (G) determining the range of the object on the basis of the location of the stored data with respect to the location of the second image, of the set of the N successive elements of the second image which has been regarded as being in substantial coincidence with the N successive elements of the first image.

2. A method according to claim 1, wherein the detection step comprises:
   detecting each difference between the analog data on each of the N successive elements of the first image and the analog data on each corresponding image element of each set of the N successive elements of the second image;
   adding the absolute values of the differences on each of the plurality of sets of N pairs of corresponding image elements; and
   detecting the minimum among the added values, thereby providing a set of the N successive elements of the second image whose added value is the minimum, as a set which is in substantial coincidence with the N successive elements of the first image.

3. A method according to claim 1, wherein the detection step comprises:
   multiplying the analog data on each of the N successive elements of the first image by the analog data on each corresponding image element of each set of the N successive elements of the second image;
   adding the productions of the multiplication on each of the plurality of sets of N pairs of corresponding image elements;
   detecting whether the added value reaches a predetermined level; and
   providing a set of the N successive elements of the second image whose added value reaches a predetermined level as a set which is in substantial coincidence with the N successive elements of the first image.

4. A method according to claim 1, wherein said location storing step includes counting address number, within the second image, of each set of the N successive elements of the second image whose analog data is stored.

5. A method according to claim 4, wherein said determination step includes latching the counted address number, at the time when the set of the N successive elements of the second image which can be regarded as being in substantial coincidence with the N successive elements of the first image has been detected through said detection step.

6. An apparatus for detecting a range of an object comprising:
   (A) optical means arranged to form first and second images of the object along different sightlines;
   (B) image sensing means arranged to receive the first and second images to produce electrical analog data for each image element of the first and second images;
   (C) first data storing means adapted for storing the analog data of the first image on a first set of a plurality of N successive elements;
   (D) correlating means for successively correlating the analog data of the second image on each of a plurality of different sets of N successive elements with the analog data of the first image on the N successive elements, said correlating means including second data storing means for successively storing, on one set by set basis, the analog data on each of said plurality of sets of the N successive elements of the second image;

(E) location storing means for successively storing the location of each of the plurality of sets of the N successive elements of the second image whose analog data is correlated by the correlating means with the analog data on the N successive elements of the first image;

(F) detecting means for detecting, through said correlation by said correlation means, a set of the N successive elements of the second image which can be regarded as being in substantial coincidence with the N successive elements of the first image; and (G) range determining means for determining the range of the object on the basis of the location of the stored data with respect to the location of the second image, of the set of the N successive elements of the second image which has been regarded as being in substantial coincidence with the N successive elements of the first image.

7. An apparatus according to claim 6, wherein said detecting means includes first circuit means for detecting each difference between the analog data on each of the N successive elements of the first image and the analog data on each corresponding image element of each set of the N successive elements of the second image;

second circuit means for adding the absolute values of the differences on each of the plurality of sets of N pairs of corresponding image elements; and third circuit means for detecting the minimum among the added values, thereby providing a set of the N successive elements of the second image whose added value is the minimum, as a set which is in substantial coincidence with the N successive elements of the first image.

8. An apparatus according to claim 6, wherein said detecting means includes first circuit means for multiplying the analog data on each of the N successive elements of the first image by the analog data on each corresponding image element of each set of the N successive elements of the second image, and adding the productions of the multiplication and providing the total thereof on each of the plurality of sets of N pairs of corresponding image elements; and second circuit means for detecting whether the total reaches a predetermined level, the set of the N successive elements of the second image whose total reaches the predetermined level being regarded as a set which is in substantial coincidence with the N successive elements of the first image.

9. An apparatus according to claim 6, wherein said data storing means is a first analog shift register with N storing locations for storing the analog data for the N successive elements of the first image, and wherein said correlating means is a second analog shift register with N storing locations of successively storing, on one set by one set basis, said analog data for each of the plurality of sets of the N successive elements of the second image.

10. An apparatus according to claim 9, wherein said first and second analog shift registers are each serial in-parallel out type analog shift registers.

11. An apparatus according to claim 10, wherein said detecting means comprises:

first circuit means for detecting each difference between the analog data on each of the N successive elements of the first image, provided by said first analog shift register, and the analog data on each corresponding image element of each set of the N successive elements of the second image, provided by said second analog shift register, said first circuit means being coupled to said first and second analog shift registers;

second circuit means for adding the absolute values of the differences on each of the plurality of set of N pairs of corresponding image elements; and third circuit means for detecting the minimum among the added values, thereby providing a set of the N successive elements of the second image whose added value is the minimum, as a set which is in substantial coincidence with the N successive elements of the first image.

12. An apparatus according to claim 10, wherein said detection means comprises:

first circuit means for multiplying the analog data on each of the N successive elements of the first image provided by said first analog shift register by the analog data on each corresponding image element of each set of the N successive elements of the second image provided by said second shift register, and adding the productions of the multiplication and providing the total thereof on each of the plurality of sets of N pairs of corresponding image elements, said first circuit means being coupled to said first and second analog shift registers; and second circuit means for detecting whether the total reaches a predetermined level, the set of the N successive elements of the second image whose total reaches the predetermined level being regarded as a set which is in substantial coincidence with the N successive elements for the first image.

13. An apparatus according to claim 6, wherein said optical means comprises:

first optical channel means for focusing the first image onto a first portion of the image sensing means;

second optical channel means for focusing said second image onto a second portion of said image sensing means, said second optical channel means being disposed away from said first optical channel means so that the first and second image are derived along different sightlines.

14. An apparatus according to claim 13, wherein said image sensing means comprises a first array of photo-sensors for receiving the first image and a second array of photo-sensors for receiving the second image.

15. An apparatus according to claim 14, wherein said first array of photo-sensors includes a first number of photo-sensors, and said second array of photo-sensors includes a second number of photo-sensors, the second number being larger than the first number.

16. An apparatus according to claim 13, wherein said image sensing means comprises an array of photo-sensors for receiving both of said first and second images.

17. An apparatus according to claim 16, wherein said array of photo-sensors includes:

a first region including a first number of photo-sensors for receiving the first image; and a second region including a second number of photo-sensors for receiving the second image, the second number being larger than the first number.

18. An apparatus according to claim 6, wherein said image sensing means includes a plurality of image sensing elements for sensing the image elements of said first and second images and producing an analog output as said analog data on each image elements of the first and second images;

said apparatus further comprising driver circuit means for electrically driving each of said image sensing elements of the image sensing means, said driver circuit means being coupled to the image sensing means and providing intermittent start pulses and intermittent drive pulses.

19. An apparatus according to claim 18, wherein said location storing means includes pulse counting means for counting the number of the drive pulses provided by said driver circuit means to said image sensing means.

20. An apparatus according to claim 19, wherein said range determining means comprises latching means for latching a counted number of said pulse counting means, when the set of the N successive elements of the second image which can be regarded as being in substantial coincidence with the N successive elements of the first is detected.

21. An apparatus according to claim 18, further comprising adjusting circuit means for adjusting a light receiving time period of each of said image sensing elements of the image sensing means, said adjusting circuit means being responsible to an analog output produced from said image sensing means, and being coupled to said driver circuit means to adjust in accordance with the level of said analog output the time period of the start pulses to be provided from said driver circuit means to said image sensing means.

22. An apparatus according to claim 21, wherein said adjusting circuit means includes:

first circuit means, coupled to said driver circuit means, for producing first reference clock pulses for determining timing of the drive pulses to be provided from said driver circuit means to said image sensing means;

second circuit means, coupled to said driver circuit means, for producing second reference clock pulses for determining timing of the start pulses to be provided from said driver circuit means to said image sensing means;

third circuit means for detecting a peak level of the analog output produced by said image sensing means; and fourth circuit means, coupled to said third circuit means, for adjusting timing of the second reference clock pulses generated by said second circuit means in response to an output of said third circuit means, thereby adjusting the timing of the second reference clock pulses generated by said second circuit means, thus adjusting time period of the start pulses to be applied from said driver circuit means to said image sensing means.

23. An apparatus according to claim 22, wherein said second circuit means is coupled to said first circuit means to generate the second reference clock pulses for every predetermined number of the first reference clock pulses generated by said first circuit means; and said fourth circuit means is coupled to said first circuit means to adjust the timing of the first reference clock pulses to be generated by said first reference clock pulses, thereby to adjust the timing of the second reference clock pulses generated by said second circuit means.

* * * * *

UNITED STATES PATENT AND TRADEMARK OFFICE
CERTIFICATE OF CORRECTION

PATENT NO. : 4,178,098
DATED : December 11, 1979
INVENTOR(S) : NORIYUKI ASANO, ET AL It is certified that error appears in the above-identified patent and that said Letters Patent are hereby corrected as shown below:

In Abstract, line 9, delete "therein".

Col. 2, line 7, change "Horsoe" to --Hosoe--;
line 8, delete the comma after ";" same line, insert --)-- after --Device--.

Col. 4, line 23, change "no-coincidence" to --non-coincidence--.

Col. 9, line 64, delete "when one and".

Col. 10, line 6, after "3F" insert --)--;
line 21, change "signals" to --signal--;
line 44, change "cause" to --course--;
line 53, change "as" to --at--.

Col. 11, line 44, change "is" to --designated--;
line 68, after "coincidence" insert --signal--.

UNITED STATES PATENT AND TRADEMARK OFFICE
CERTIFICATE OF CORRECTION

PATENT NO. : 4,178,098  Page 2 of 5
DATED : December 11, 1979
INVENTOR(S) : NORIYUKI ASANO, ET AL It is certified that error appears in the above-identified patent and that said Letters Patent are hereby corrected as shown below:

Col. 12, line 14, change "Q" to --$\overline{Q}$--;
line 17. change "(output d-Fig. 3J may be)" to --(output d) Fig. 3J may be--;
line 35, change "eke" to --the--.
line 52, change "twoshift" to --two shift--;
line 66, change "$D_1'-D_N'$" to --$D'_1-D'_N$-- .

Col. 13, line 39, change "20;" to --20.--;
line 54, change "calculate" to --calculates--;
line 61, change "products" to --produces--.

Col. 14, line 12, change "arrays" to --array--;
line 22, change "members" to --numbers--;
line 24, change "2 N" to --2N--;
line 26, after "case," insert --an--;
line 33, after "collimating" delete "to";
line 49, change "x" to --$\underline{X}$--;
line 49, change "position forming" to --forming position--;
line 52, change "X" to --$\underline{X}$--;
line 67, delete "provide"
line 68, change "X" to --$\underline{X}$--.

UNITED STATES PATENT AND TRADEMARK OFFICE
CERTIFICATE OF CORRECTION

PATENT NO. : 4,178,098

DATED : December 11, 1979

INVENTOR(S) : NORIYUKI ASANO, ET AL

It is certified that error appears in the above-identified patent and that said Letters Patent are hereby corrected as shown below:

Col. 15, line 1, change "wil" to --will--;
        line 7, change "output c" to --output $\underline{c}$--;
        line 22, change "number" to --numbers--;
        line 31, after "applicable" insert --as it is--;
        line 44, change "elements" to --element--;
        line 47, change "." to --,--;
        line 57, change "the" (first occurrence) to --a--.

Col. 16, line 16, after "coincided" insert --with--;
        line 19, change "said" to --paid--;
        line 33, change "as rated" to --integrated--;
        line 34, change "project" to --projected--;
        line 36, insert --(-- before "hence";
        line 61, insert --.-- after "discharging";
        line 64, change "releawed" to --released--.

Col. 18, line 9, delete "coming".

Col. 20, line 13, change "to" to --a--.

Col. 21, line 21, change "said" to --such--;
        line 39, change "thorugh" to --through--.

UNITED STATES PATENT AND TRADEMARK OFFICE
CERTIFICATE OF CORRECTION

PATENT NO. : 4,178,098
DATED : December 11, 1979
INVENTOR(S) : NORIYUKI ASANO, ET AL It is certified that error appears in the above-identified patent and that said Letters Patent are hereby corrected as shown below:

```
Col. 22, line 23, after "with" insert --the--;
        line 48, change "though" to --through--
        line 55, change "leveer" to --lever--.

Col. 23, line 25, after "thereby" insert --to--;
        line 55, change "photographif" to
--photographic--;
        line 61, delete "four" before "light" and
after "the" (second occurrence) insert --four--.

Col. 24, line 2, change "U" to --U--;
        line 23, change "conofronta-" to --confronta---;
        line 27, change "U" to --U--;
        line 50, change "r" to --r--;
        line 52, change "low level" to --"low" level--.

Col. 25, line 50, change "closing" to --thrown in--; and
same line, change "throw-in" to --closing--;
        line 52, change "U" to --U--;
        line 56, change "U" to --U--;
        line 59, change ". This indicates" to --indicate--.
```

UNITED STATES PATENT AND TRADEMARK OFFICE
CERTIFICATE OF CORRECTION

PATENT NO. : 4,178,098      Page 5 of 5

DATED : December 11, 1979

INVENTOR(S) : Noriyuki Asano, et al.

It is certified that error appears in the above-identified patent and that said Letters Patent are hereby corrected as shown below:

```
Col. 26, line  6, change "QA" to --OA--;
         line 17, change "lends" to --lens--;
         line 21, change "81 a if of the" to --81 if the--
         line 30, change "U" to --U--;
         line 46, change "U" to --U--;
         line 48, change "different in" to --if--.

Col. 27, line  9, change "H" to --N--;
         line 20, after "than" insert --D'--.

Col. 28, line 44, delete "," after "by";
         line 56, change "where" to --whereby--.

Col. 29, line  1, change "in a" to --In case a--;
         line  3, change "aboved" to --should--;
         line  9, after "constitute" insert --a--;
         line 11, delete the "," after "photo-sensor";
         line 16, delete "of" after "both".
Col. 31, line 65, change "of" to --for--.

Col. 32, line 42, change "for" to --of--.

Col. 33, line 29, after "first" insert --image--.
```

Signed and Sealed this

Sixth Day of May 1980

[SEAL]

Attest:

SIDNEY A. DIAMOND

Attesting Officer

Commissioner of Patents and Trademarks